US012177937B2

United States Patent
Chandramouli et al.

(10) Patent No.: US 12,177,937 B2
(45) Date of Patent: Dec. 24, 2024

(54) GUTI REALLOCATION FOR MT-EDT

(71) Applicant: NOKIA TECHNOLOGIES OY, Espoo (FI)

(72) Inventors: Devaki Chandramouli, Plano, TX (US); Srinivasan Selvaganapathy, Bangalore (IN); Hannu Petri Hietalahti, Kiviniemi (FI); Suresh Nair, Whippany, NJ (US); Philippe Godin, Versailles (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 332 days.

(21) Appl. No.: 17/797,631

(22) PCT Filed: Feb. 4, 2021

(86) PCT No.: PCT/EP2021/052630
§ 371 (c)(1),
(2) Date: Aug. 4, 2022

(87) PCT Pub. No.: WO2021/156347
PCT Pub. Date: Aug. 12, 2021

(65) Prior Publication Data
US 2023/0073757 A1  Mar. 9, 2023

(30) Foreign Application Priority Data

Feb. 6, 2020 (IN) .............................. 202041005269
Feb. 19, 2020 (IN) .............................. 202044007133

(51) Int. Cl.
*H04W 12/06* (2021.01)
*H04L 67/303* (2022.01)
(Continued)

(52) U.S. Cl.
CPC ............. *H04W 8/26* (2013.01); *H04W 60/00* (2013.01); *H04W 68/005* (2013.01)

(58) Field of Classification Search
CPC ..... H04W 76/38; H04W 12/72; H04W 12/75; H04W 68/00; H04W 8/06; H04W 60/005; H04W 76/11; H04L 41/0816
(Continued)

(56) References Cited

U.S. PATENT DOCUMENTS

2016/0080971 A1 * 3/2016 Harris .................... H04L 12/18
                                                                    370/235
2019/0223018 A1   7/2019 Norrman et al.
(Continued)

FOREIGN PATENT DOCUMENTS

WO    WO 2021/156399 A1    8/2021

OTHER PUBLICATIONS

"3rd Generation Partnership Project; Technical Specification Group Services and System Aspects; System architecture for the 5G System (5GS); Stage 2 (Release 16)", 3GPP TS 23.501 v16.3.0, (Dec. 2019), 417 pages.
International Search Report and Written Opinion for Patent Cooperation Treaty Application No. PCT/EP2021/052630 dated Apr. 29, 2021, 13 pages.
(Continued)

*Primary Examiner* — Khaled M Kassim
*Assistant Examiner* — Jason A Harley
(74) *Attorney, Agent, or Firm* — Robert P. Michal, Esq.; Carter, DeLuca & Farrell LLP

(57) ABSTRACT

An apparatus and a method for reallocation of global unique temporary identifier (GUTI) in 5G networks are disclosed. The method includes receiving, at a user equipment, a first message from a network, the first message including a first global unique temporary identifier and additional informa-
(Continued)

tion, at least the first global unique temporary identifier being as-signed to the user equipment; receiving a first data transmission including the first global unique temporary identifier from the network; in response to receiving the first data transmission, deriving, at the user equipment, a second global unique temporary identifier based on the first global unique temporary identifier and the additional information; and receiving a second data transmission including the second global unique temporary identifier from the network.

1 Claim, 11 Drawing Sheets

(51) Int. Cl.
| | | |
|---|---|---|
| *H04L 101/654* | (2022.01) | |
| *H04W 8/12* | (2009.01) | |
| *H04W 8/18* | (2009.01) | |
| *H04W 8/26* | (2009.01) | |
| *H04W 12/72* | (2021.01) | |
| *H04W 60/00* | (2009.01) | |
| *H04W 68/00* | (2009.01) | |
| *H04W 72/04* | (2023.01) | |
| *H04W 84/12* | (2009.01) | |

(58) Field of Classification Search
USPC .......................................... 370/328; 455/411
See application file for complete search history.

(56) References Cited

U.S. PATENT DOCUMENTS

| | | | | |
|---|---|---|---|---|
| 2019/0254094 | A1* | 8/2019 | Babu | H04W 76/11 |
| 2020/0396587 | A1* | 12/2020 | Kim | H04W 8/08 |
| 2021/0105837 | A1* | 4/2021 | Lee | H04W 8/26 |
| 2022/0225083 | A1* | 7/2022 | Borisoglebski | H04W 8/183 |
| 2022/0330194 | A1* | 10/2022 | Kumar | H04W 68/02 |
| 2022/0345894 | A1* | 10/2022 | Aghili | H04W 12/06 |

OTHER PUBLICATIONS

Qualcomm Incorporated, "5G-GUTI Allocation in MT-EDT Procedure", SA WG2 Meeting #136, S2-1911720, (Nov. 18-22, 2019), 3 pages.
Qualcomm Incorporated, "MT-EDT Introduction", SA WG2 Meeting #136-AH, S2-2000264, (Jan. 13-17, 2020), 40 pages.

* cited by examiner

GUTI REALLOCATION FOR MT-EDT

CROSS-REFERENCE TO RELATED APPLICATIONS

This application is a national phase entry of International Application No. PCT/EP2021/052630, filed Feb. 4, 2021, which claims priority to Indian application No. 202041005269, filed Feb. 6, 2020, and claims priority to Indian application No. 202044007133, filed Feb. 19, 2020, the contents of which are hereby incorporated by reference in their entirety.

FIELD

The subject-matter described herein generally relates to cellular systems and more particularly, to cellular systems including 5G networks. Yet more particularly, the subject-matter described herein relates to reallocation of global unique temporary identifier (GUTI).

BACKGROUND

Wireless communication systems are rapidly growing in usage. Further, the wireless communication systems have evolved from voice-only communications to also include the transmission of data, such as Internet and multimedia content.

In these wireless communication systems, efficient signaling and transmission of data, especially of small data, have become increasingly important. Small data transmissions from network to user devices, and vice versa, are used without requiring the user device to setup a Radio Resource Control (RRC) connection for transmitting/receiving the small data. To identify the user device, an identifier assigned to the user device is used and included in the small data transmissions. As security has also become important, particularly to avoid tracking of user device based on such identifier in the network and/or hijack communication flows, a reallocation procedure to frequently reassign the identifier towards the user device is used. As improvements in this field are desired, a mechanism for the reallocation procedure, particularly for small data transmissions, is required.

SUMMARY

In some example embodiments, there may be provided a method that includes receiving, at a user equipment, a first message from a network, the first message including a first global unique temporary identifier and additional information, at least the first global unique temporary identifier being assigned to the user equipment; receiving a first data transmission including the first global unique temporary identifier from the network; in response to receiving the first data transmission, deriving, at the user equipment, a second global unique temporary identifier based on the first global unique temporary identifier and the additional information; and receiving a second data transmission including the second global unique temporary identifier from the network.

In some example embodiments, there may be provided a method that includes transmitting, by a network, a first message to a user equipment, the first message including a first global unique temporary identifier and additional information, at least the first global unique temporary identifier being assigned to the user equipment; transmitting, by the network, a first data transmission including the first global unique temporary identifier to the user equipment; in response to transmitting the first data transmission, deriving, at the network, a second global unique temporary identifier based on the first global unique temporary identifier and the additional information, the second global unique temporary identifier being assigned to the user equipment; and transmitting, by the network, a second data transmission having the second global unique temporary identifier to the user equipment.

In some variations, one or more of the features disclosed herein including the following features can optionally be included in any feasible combination.

The first message may be received/transmitted during a registration procedure for registering the user equipment with the network or a update procedure for updating information of the user equipment at the network.

The first message may be a Registration Accept message in the registration procedure or a UE Configuration Update (UCU) message in the update procedure.

The network may comprise a network node and the network node may be an Access and Mobility Management function (AMF).

The additional information may be an offset value or a Temporary Mobile Station Identifier (TMSI) key value.

At least one of the first and second data transmissions may be transmitted to/received by the user equipment while the user equipment is in idle mode, may be a paging message or mobile-terminated early data transmission (MT-EDT) may be a transmission of a single data packet whose size fits into a single radio transmission, and/or may further include a new additional information to be used in deriving the second global unique temporary identifier.

At least one of the additional and the new additional information may be scrambled based on an International Mobile Subscriber Identity (IMSI) of the user equipment.

The method may comprise at least one of the following: reserving the first global unique temporary identifier specifically for the user equipment, reserving the second global unique temporary identifier specifically for the user equipment; and reserving the additional information specifically for the user equipment.

The method may comprise: reserving the second global unique temporary identifier for the user equipment prior transmitting/receiving the first data transmission, wherein the second global unique temporary identifier is derived based on the first global unique temporary identifier and the additional information; and in response to transmitting the first data transmission, reserving a third global unique temporary identifier derived based on the second global unique temporary identifier and the additional information, the third global unique temporary identifier to be used in subsequent data transmission to the user equipment.

In some example embodiments, there may be provided an apparatus comprising: at least one processor; and at least one memory including computer program code, the at least one memory and the computer program code configured to, with the at least one processor, cause the apparatus to at least: receive a first message from a network, the first message including a first global unique temporary identifier and additional information, at least the first global unique temporary identifier being assigned to a user equipment; receive a first data transmission including the first global unique temporary identifier from the network; in response to receiving the first data transmission, derive a second global unique temporary identifier based on the first global unique temporary identifier and the additional information; and receive a second data transmission including the second global unique temporary identifier from the network.

The computer program code may be configured to, with the at least one processor, cause the apparatus to carry out one or more of the steps noted above with respect to the example method.

In some example embodiments, there may be provided an apparatus comprising: means for receiving a first message from a network, the first message including a first global unique temporary identifier and additional information, at least the first global unique temporary identifier being assigned to a user equipment; means for receiving a first data transmission including the first global unique temporary identifier from the network; means for deriving, in response to receiving the first data transmission, a second global unique temporary identifier based on the first global unique temporary identifier and the additional information; and means for receiving a second data transmission including the second global unique temporary identifier from the network.

The apparatus may include one or more means being adapted to carry out one or more of the steps noted above with respect to the example method.

The above-noted aspects and features may be implemented in systems, apparatuses, methods, articles and/or non-transitory computer-readable media depending on the desired configuration. The subject-matter described herein may be implemented in and/or used with a number of different types of devices, including but not limited to cellular phones, tablet computers, wearable computing devices, portable media players, and any of various other computing devices.

This summary is intended to provide a brief overview of some of the aspects and features according to the subject-matter described in this document. Accordingly, it will be appreciated that the above-described features are merely examples and should not be construed to narrow the scope of the subject-matter described herein in any way. Other features, aspects, and advantages of the subject-matter described herein will become apparent from the following detailed description, drawings and claims.

BRIEF DESCRIPTION OF THE DRAWINGS

A better understanding of the subject-matter described herein can be obtained when the following detailed description of various embodiments is considered in conjunction with the following drawings, in which.

DETAILED DESCRIPTION

Figure 1:
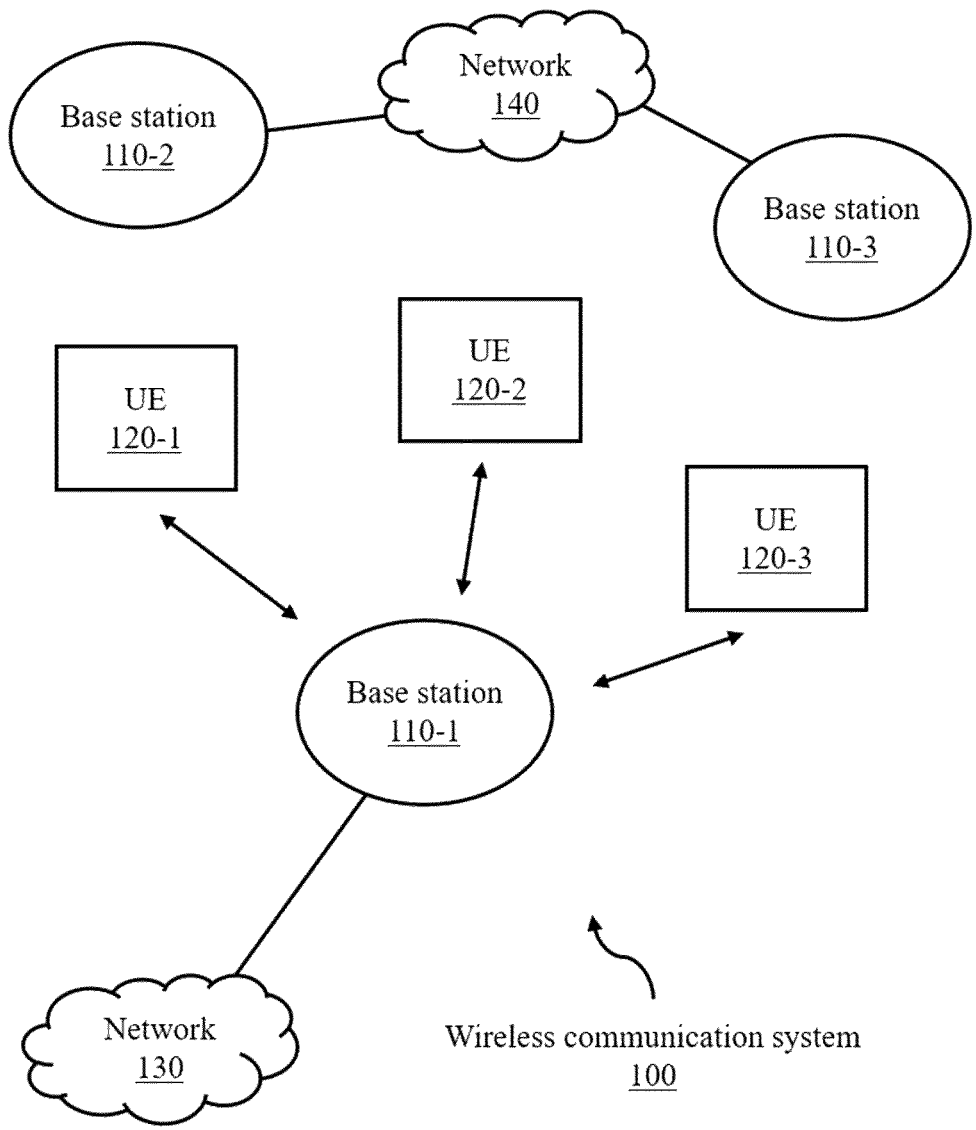
FIG. 1 illustrates a simplified wireless communication system, according to some embodiments.

FIG. 1 illustrates a simplified wireless communication system 100, according to some embodiments. It is noted that the system of FIG. 1 is merely one example of a possible system, and that features of the subject-matter described herein may be implemented in any of various systems, as desired.

As shown, the wireless communication system 100 includes a base station 110-1 which communicates over a transmission medium with one or more user devices 120. In FIG. 1, only three user devices 120-1, 120-2, and 120-3 are shown, without limitation. Each of the user devices 120-1, 120-2, and 120-3 may be referred to herein as a "user equipment" (UE). Thus, the user devices 120 are referred to as UEs or UE devices.

As used herein, the term "user equipment" may refer to any of various types of computer systems devices which are mobile or portable and which perform wireless communications. Examples of UEs include mobile telephones or smart phones, portable gaming devices, laptops, wearable devices (e.g., smart watch, smart glasses), Personal Digital Assistants (PDAs), portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

The base station (BS) 110-1 may be a base transceiver station (BTS) or cell site (a "cellular base station"), and may include hardware that enables wireless communication with the UEs 120.

As used herein, the term "base station" has the full breadth of its ordinary meaning, and at least includes a wireless communication station installed at a fixed location and used to communicate as part of a wireless telephone system or radio system.

The communication area (or coverage area) of the base station 110 may be referred to as a "cell." The base station 110 and the UEs 120 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. If the base station 110-1 is implemented in the context of LTE, it may alternately be referred to as an "eNodeB" or "eNB". If the base station 110-1 is implemented in the context of 5G NR, it may alternately be referred to as "gNodeB" or "gNB".

As shown, the base station 110-1 may also be equipped to communicate with a network 130 (e.g., a core network of a cellular service provider, a telecommunication network such as a public switched telephone network (PSTN), and/or the Internet, among various possibilities). Thus, the base station 110-1 may facilitate communication between the user devices 120 and/or between the user devices 120 and the network 130. In particular, the cellular base station 110-1 may provide UEs 120 with various telecommunication capabilities, such as voice, SMS and/or data services.

The base station 110-1 and other similar base stations (such as base stations 110-2 and 110-3) operating according to the same or a different cellular communication standard may thus be provided as a network of cells, which may provide continuous or nearly continuous overlapping service to UEs 120 and similar devices over a geographic area via one or more cellular communication standards.

Other base station(s), e.g. base station 110-1 and/or base station 110-3, may also be equipped to communicate with a network 140 (e.g., a core network of a cellular service provider, a telecommunication network such as a public switched telephone network (PSTN), and/or the Internet, among various possibilities). Hence, the other base station(s) may facilitate communication between the user devices 120 and/or between the user devices 120 and the network 140, for example to provide UEs 120 with various telecommunication capabilities, such as voice, SMS and/or data services.

Networks with which the base stations may communicate may be part of a common overall network or communication system, or belong to different communication systems or environments.

Thus, while base station 110-1 may act as a "serving cell" for UEs 120 as illustrated in FIG. 1, each UE 120 may also be capable of receiving signals from (and possibly within communication range of) one or more other cells (which might be provided by base stations 110 and/or any other base stations), which may be referred to as "neighboring cells". Such cells may also be capable of facilitating communication between user devices 120 and/or between user devices 120 and the network 130. Such cells may include "macro" cells, "micro" cells, "pico" cells, and/or cells which provide any of various other granularities of service area size. For example, base stations 110-1 and 110-2 illustrated in FIG. 1 might be macro cells, while base station 110-3 might be a micro cell. Other configurations are also possible.

In some embodiments, base station 110-1 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

The UE 120 may be capable of communicating using multiple wireless communication standards. For example, the UE 120 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 120 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
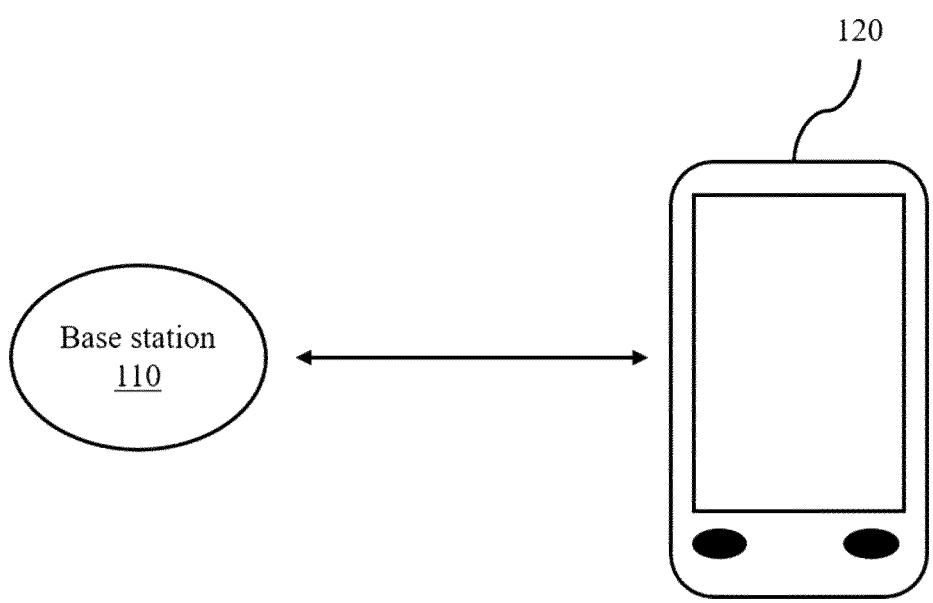
FIG. 2 illustrates a base station (BS) in communication with a user equipment (UE) according to some embodiments.

FIG. 2 illustrates user equipment 120 (e.g., one of the devices 120-1, 120-2 and 120-3) in communication with a base station 110, according to some embodiments. The UE 120 may be a device with cellular communication capability such as a mobile phone, a handheld device, a computer or a tablet, or virtually any type of wireless device.

The UE 120 may include a processor that is configured to execute program instructions stored in memory. The UE 120 may perform any of the method embodiments described herein by executing such stored instructions. Alternatively, or in addition, the UE 120 may include a programmable hardware element such as an field-programmable gate array (FPGA) that is configured to perform any of the method embodiments described herein, or any portion of any of the method embodiments described herein.

The UE 120 may include one or more antennas for communicating using one or more wireless communication protocols or technologies. In some embodiments, the UE 120 may be configured to communicate using, for example, CDMA2000 (1×RTT/1×EVDO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 120 may share one or more parts of a receive and/or transmit chain between multiple wireless communication technologies, such as those discussed above.

In some embodiments, the UE 120 may include separate transmit and/or receive chains (e.g., including separate antennas and other radio components) for each wireless communication protocol with which it is configured to communicate. As a further possibility, the UE 120 may include one or more radios which are shared between multiple wireless communication protocols, and one or more radios which are used exclusively by a single wireless communication protocol. For example, the UE 120 might include a shared radio for communicating using either of LTE or 5G NR (or LTE or 1×RTT or LTE or GSM), and separate radios for communicating using each of Wi-Fi and Bluetooth™. Other configurations are also possible.

Figure 3:
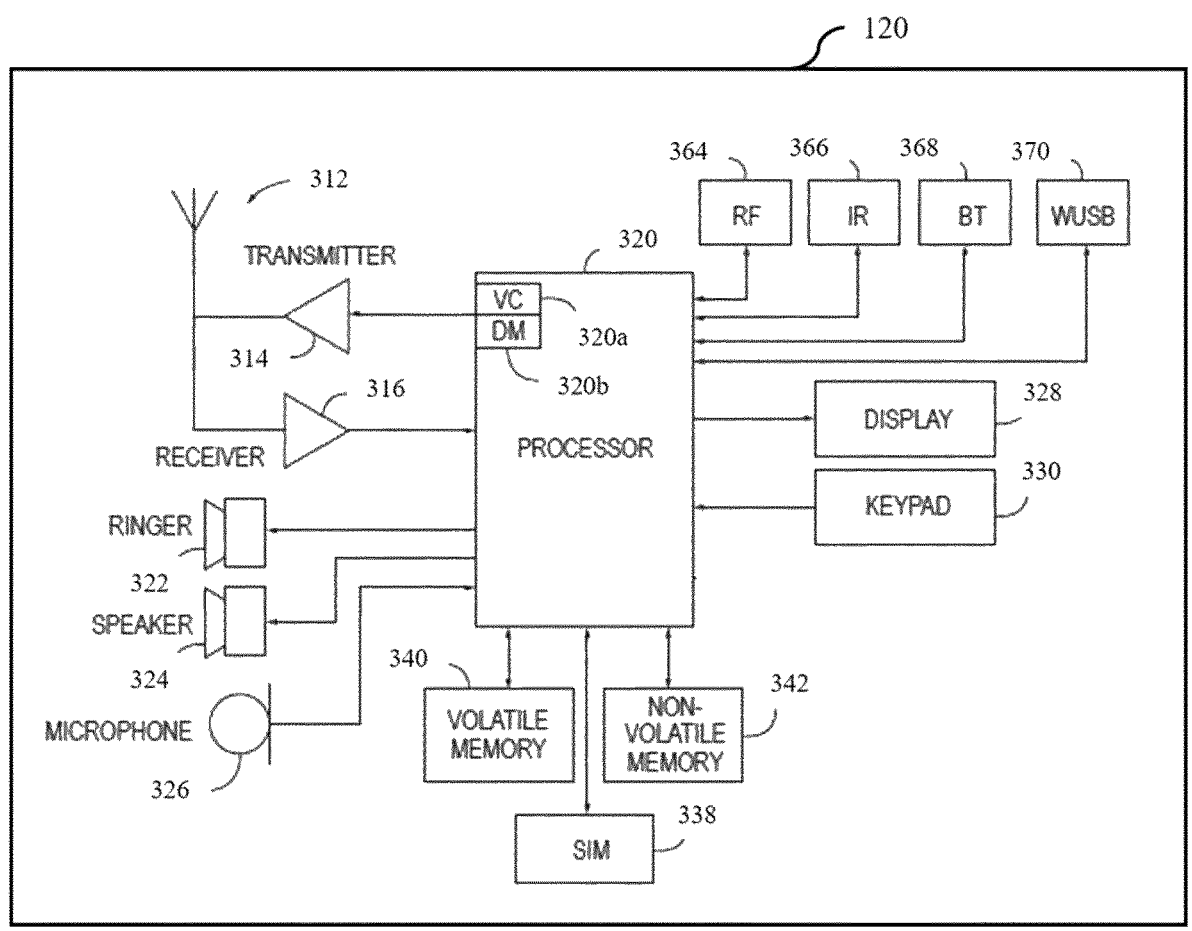
FIG. 3 illustrates a simplified block diagram of a UE according to some embodiments.

FIG. 3 illustrates a simplified block diagram of a UE 120, according to some embodiments. It is noted that the block diagram of the UE 120 of FIG. 3 is only one example of a possible user device. According to embodiments, UE 120 may be a user device, a mobile device or mobile station, a wireless device or wireless station, a desktop computer or computing device, a mobile computing device (e.g., a laptop, notebook, or portable computing device), a tablet and/or a combination of devices, among other devices.

As shown, the UE 120 may include a set of components configured to perform core functions. For example, this set of components may be implemented as a system on chip (SOC), which may include portions for various purposes. Alternatively, this set of components may be implemented as separate components or groups of components for the various purposes. The set of components may be coupled (e.g., communicatively; directly or indirectly) to various other circuits of the UE 120.

The UE 120 may include at least one antenna 312 in communication with a transmitter 314 and a receiver 316. Alternatively, transmit and receive antennas may be separate. The UE 120 may also include a processor 320 configured to provide signals to and receive signals from the transmitter 314 and receiver 316, respectively, and to control the functioning of the UE 120. Processor 320 may be configured to control the functioning of the transmitter 314 and receiver 316 by effecting control signaling via electrical leads to the transmitter 314 and receiver 316. Likewise, the processor 320 may be configured to control other elements of the UE 120 by effecting control signaling via electrical leads connecting processor 320 to the other elements, such as a display or a memory. The processor 320 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 320 may comprise a plurality of processors or processing cores.

The UE 120 may be capable of operating with one or more air interface standards, communication protocols, modulation types, access types, and/or the like. Signals sent and received by the processor 320 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the UE 120 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the UE 120 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the UE 120 may be capable of operating in accordance with 2.5G wireless communication protocols General Packet Radio Service (GPRS), Enhanced Data GSM Environment (EDGE), and/or the like. Further, for example, the UE 120 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The UE 120 may be additionally capable of operating in accordance with 3.9G wireless communication protocols, such as Long Term Evolution (LTE), Evolved Universal Terrestrial Radio Access Network (E-UTRAN), and/or the like. Additionally, for example, the UE 120 may be capable of operating in accordance with 4G wireless communication protocols, such as LTE Advanced, 5G, and/or the like as well as similar wireless communication protocols that may be subsequently developed.

It is understood that the processor 320 may include circuitry for implementing audio/video and logic functions of the UE 120. For example, the processor 320 may comprise a digital signal processor device, a microprocessor device, an analog-to-digital converter, a digital-to-analog converter, and/or the like. Control and signal processing functions of the UE 120 may be allocated between these devices according to their respective capabilities. The processor 320 may additionally comprise an internal voice coder (VC) 320*a*, an internal data modem (DM) 320*b*, and/or the like. Further, the processor 320 may include functionality to operate one or more software programs, which may be stored in memory. In general, the processor 320 and stored software instructions may be configured to cause the UE 120 to perform actions. For example, the processor 320 may be capable of operating a connectivity program, such as a web browser. The connectivity program may allow the UE 120 to transmit and receive web content, such as location-based content, according to a protocol, such as wireless application protocol (WAP), hypertext transfer protocol (HTTP), and/or the like.

The UE 120 may also comprise a user interface including, for example, an earphone or speaker 324, a ringer 322, a microphone 326, a display 328, a user input interface, and/or the like, which may be operationally coupled to the processor 320. The display 328 may, as noted above, include a touch sensitive display, where a user may touch and/or gesture to make selections, enter values, and/or the like. The processor 320 may also include user interface circuitry configured to control at least some functions of one or more elements of the user interface, such as the speaker 324, the ringer 322, the microphone 326, the display 328, and/or the like. The processor 320 and/or user interface circuitry comprising the processor 320 may be configured to control one or more functions of one or more elements of the user interface through computer program instructions, for example, software and/or firmware, stored on a memory accessible to the processor 320, for example, volatile memory 340, non-volatile memory 342, and/or the like. The UE 120 may include a battery for powering various circuits related to the mobile terminal, for example, a circuit to provide mechanical vibration as a detectable output. The user input interface may comprise devices allowing the UE 120 to receive data, such as a keypad 330 (which can be a virtual keyboard presented on display 328 or an externally coupled keyboard) and/or other input devices.

As shown in FIG. 3, the UE 120 may also include one or more mechanisms for sharing and/or obtaining data. For example, UE 120 may include a short-range radio frequency (RF) transceiver and/or interrogator 364, so data may be shared with and/or obtained from electronic devices in accordance with RF techniques. The UE 120 may include other short-range transceivers, such as an infrared (IR) transceiver 366, a Bluetooth™ (BT) transceiver 368 operating using Bluetooth™ wireless technology, a wireless universal serial bus (USB) transceiver 370, a Bluetooth™ Low Energy transceiver, a ZigBee transceiver, an ANT transceiver, a cellular device-to-device transceiver, a wireless local area link transceiver, and/or any other short-range radio technology. The UE 120 and, in particular, the short-range transceiver may be capable of transmitting data to and/or receiving data from electronic devices within the proximity of the apparatus, such as within 10 meters, for example. The UE 120 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The UE 120 may comprise memory, such as a subscriber identity module (SIM) 338, a removable user identity module (R-UIM), an eUICC, an UICC, and/or the like, which may store information elements related to a mobile subscriber. In addition to the SIM, the UE 120 may include other removable and/or fixed memory. The UE 120 may include volatile memory 340 and/or non-volatile memory 342. For example, the volatile memory 340 may include Random Access Memory (RAM) including dynamic and/or static RAM, on-chip or off-chip cache memory, and/or the like. The non-volatile memory 342, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 340, the non-volatile memory 342 may include a cache area for temporary storage of data. At least part of the volatile and/or non-volatile memory may be embedded in the processor 320. The memories may store one or more software programs, instructions, pieces of information, data, and/or the like which may be used by the apparatus for performing operations disclosed herein.

The memories may comprise an identifier, such as an International Mobile Equipment Identification (IMEI) code, capable of uniquely identifying the UE 120. The memories may comprise an identifier, such as an international mobile equipment identification (IMEI) code, capable of uniquely identifying the UE 120. In the example embodiment, the processor 320 may be configured using computer code stored at memory 340 and/or 342 to cause the processor 320 to perform operations disclosed herein.

Some of the embodiments disclosed herein may be implemented in software, hardware, application logic, or a combination of software, hardware, and application logic. The software, application logic, and/or hardware may reside on the memory 340, the processor 320, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 3, computer-readable medium may comprise a non-transitory computer-readable storage medium that may be any media that can contain or store the instructions for use by or in connection with an instruction execution system, apparatus, or device, such as a computer.

Figure 4:
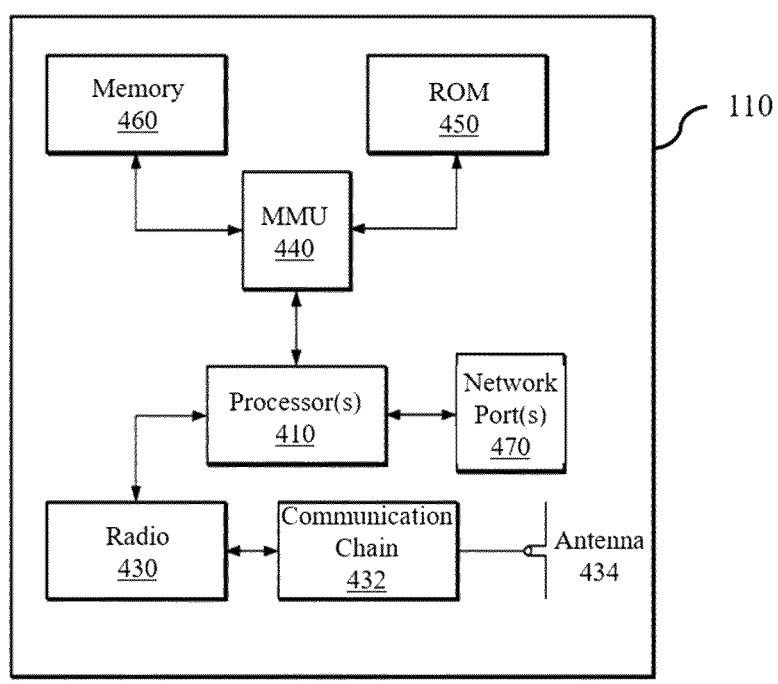
FIG. 4 illustrates a simplified block diagram of a BS according to some embodiments.

FIG. 4 illustrates a simplified block diagram of a base station 110, according to some embodiments. It is noted that the base station 110 of FIG. 4 is merely one example of a possible base station. As shown, the base station 110 may include processor(s) 410 which may execute program instructions for the base station 110. The processor(s) 410 may also be coupled to memory management unit (MMU) 440, which may be configured to receive addresses from the processor(s) 410 and translate those addresses to locations in memory (e.g., memory 460 and read only memory (ROM) 450) or to other circuits or devices.

The base station 110 may include at least one network port 470. The network port 470 may be configured to couple to a telephone network and provide a plurality of devices, such as UE 120, access to the wireless communication network 100 as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE 120. In some cases, the network port 470 may couple to a telephone network via the core network, and/or the core network may provide a telephone network (e.g., among other UE serviced by the cellular service provider).

In some embodiments, the base station 110 may be a next generation base station, e.g., a 5G New Radio (5G NR) base station, or "gNB". In such embodiments, the base station 110 may be connected to a legacy evolved packet core (EPC) network and/or to a NR core (NRC) network. In addition, the base station 110 may be considered a 5G NR cell and may include one or more transition and reception points (TRPs). In addition, a UE capable of operating according to 5G NR may be connected to one or more TRPs within one or more gNBs.

The base station 110 may include at least one antenna 434, and possibly multiple antennas. The at least one antenna 434 may be configured to operate as a wireless transceiver and may be further configured to communicate with UE 120 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 110 may be configured to communicate wirelessly using multiple wireless communication standards. In some instances, the base station 110 may include multiple radios, which may enable the base station 110 to communicate according to multiple wireless communication technologies. For example, as one possibility, the base station 110 may include an LTE radio for performing communication according to LTE as well as a 5G NR radio for performing communication according to 5G NR. In such a case, the base station 110 may be capable of operating as both an LTE base station and a 5G NR base station. As another possibility, the base station 110 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 110 may include hardware and software components for implementing or supporting implementation of features described herein. The processor 410 of the base station 110 may be configured to implement or support implementation of part or all of the methods described herein, e.g., by executing program instructions stored on a memory medium (e.g., a non-transitory computer-readable memory medium). Alternatively, the processor 410 may be configured as a programmable hardware element, such as an FPGA (Field Programmable Gate Array), or as an ASIC (Application Specific Integrated Circuit), or a combination thereof. Alternatively (or in addition) the processor 410 of the BS 110, in conjunction with one or more of the other components 430, 432, 434, 440, 450, 460, 470 may be configured to implement or support implementation of part or all of the features described herein.

In addition, as described herein, processor(s) 410 may be comprised of one or more processing elements. In other words, one or more processing elements may be included in processor(s) 410. Thus, processor(s) 410 may include one or more integrated circuits (ICs) that are configured to perform the functions of processor(s) 410. In addition, each integrated circuit may include circuitry (e.g., first circuitry, second circuitry, etc.) configured to perform the functions of processor(s) 410.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Herein, the base station 110 may also be referred to as a network node and may be configured to provide a network function, such as an Access Management function or an Access and Mobility Management function (AMF) of a 5G radio access network.

Embodiments/Examples of the subject-matter disclosed herein are described with reference to systems, apparatus, methods and mechanisms for a UE or network (e.g., network node, AMF) in a 5G system. However, all observations made in relation to 5G are not limited thereto and are applicable to any communication system.

In 5G systems (e.g. 5G NR network), at the time of registration, the UE is assigned with a global unique temporary identifier (GUTI). In some embodiments, the network (e.g., the AMF) may allocate a GUTI to the UE that is common to both 3GPP and non-3GPP access. Accordingly, it may be possible to use the same GUTI for accessing 3GPP access and non-3GPP access security contexts within the AMF for a given UE.

As used herein, the GUTI may include a 5G global unique temporary identifier, 5G-GUTI, but may also include other GUTIs or non-global unique temporary identifiers. For example, the 5G-GUTI may be structured to include a Globally Unique AMF ID (GUAMI) and a 5G Temporary Mobile Subscriber Identity (5G-TMSI) value.

A 5G-GUTI may be structured as: <5G-GUTI>=<GUAMI><5G-TMSI>, where GUAMI identifies the assigned AMF and 5G-TMSI identifies the UE uniquely within the AMF, although other variations are envisioned.

In some embodiments, the Globally Unique AMF ID (GUAMI) may be structured as: <GUAMI>=<MCC><MNC><AMF Region ID><AMF Set ID><AMF Pointer>, where AMF Region ID identifies the region, AMF Set ID uniquely identifies the AMF Set within the AMF Region and AMF Pointer uniquely identifies the AMF within the AMF Set. The AMF Region ID may address the case where there are more AMFs in the network than the number of AMFs that can be supported by AMF Set ID and AMF Pointer by enabling operators to re-use the same AMF Set IDs and AMF Pointers in different regions.

A shortened form of a GUTI, e.g. to enable more efficient radio signaling procedures (e.g. during Paging and Service Request), may be referred to as 5G Serving Temporary Mobile Subscriber Identity (5G-S-TMSI) and may be defined as: <5G-S-TMSI>=<AMF Set ID><AMF Pointer><5G-TMSI>.

Various embodiments discussed herein regarding the GUTI may also apply to the 5G-S-TMSI. For example, a 5G-S-TMSI may be used in further Non-Access Stratum, NAS, signaling towards the UE. When AMF triggers paging message, this identifier is used in the paging message to identify the UE. To enhance the security associated with 5G-GUTI assignment to avoid tracking of UE based on 5G-GUTI in the network, AMF uses 5G-GUTI reallocation procedure to frequently reassign the 5G-GUTI towards UE. AMF may start 5G-GUTI reallocation procedure as part of any ongoing NAS signaling procedure. As the 5GS-TMSI is sent as plain text (not ciphered) in the paging messages, it is necessary to reassign the 5G-GUTI as part of serving request initiated from UE in response to the paging message. This procedure is used for every NAS signaling procedure followed by paging towards UE.

For small data transmission from UEs (e.g. Cellular Internet of Things (CIoT) devices) in idle mode, Early Data Transfer (EDT) procedures are introduced in Release 15 where the small data transmission happens during the random access procedure itself without UE transition to Radio Resource Control (RRC) connected mode. A procedure where UE sends small data without setting up RRC connection during Random Access Channel (RACH) procedure may be referred to as Mobile originated Early Data Transfer (MO-EDT) procedure.

In recent developments with respect to Release 16, small data transmission from network towards UE (e.g. in idle mode) may be supported and may be referred to as Mobile terminated Early Data Transmission (MT-EDT) procedure. In such cases, the network may send the paging message to initiate MT-EDT procedure including an additional indication that the paging message is MT-EDT. As part of RACH procedure initiated in response to the paging message, the network may send the small data in a message (e.g., in the message Msg4 associated with the random access procedure) and UE enters into idle mode after receiving this packet. In this case UE does not setup RRC connection for receiving the small data.

For example, in the 5G systems, it may be required to reassign new 5G-GUTI after every unprotected use of 5G-S-TMSI which implies 5G-GUTI reassignment after every MT-EDT. When MT-EDT procedure is initiated by the network (e.g., AMF) towards UEs (e.g., 5G CIoT devices), it may be possible that an EDT transmission cannot be completed without entering into RRC connected mode. This may be due to a situation where a GUTI reallocation cannot be completed in the framework of the EDT transmission in idle mode of the UE. Then, RRC connected mode is needed to carry out or complete 5G-GUTI reallocation. Thus, the benefits of MT-EDT (e.g., using only idle mode) are lost when the UE enters connected mode. So, a mechanism for GUTI reallocation, particularly for the MT-EDT procedure, is required.

The subject-matter described herein provides solutions for use e.g. in Release 16, without being limited to that release. According to the subject-matter described herein, the network (e.g., the AMF) provides additional information (e.g., offset, algorithm, key) to the UE during registration procedure so that the network and the UE can derive the next GUTI (e.g., 5G-GUTI) in idle mode (e.g. in the context of a paging message or a small data transmission (e.g., MT-EDT) procedure). So, both the UE and the network use the additional information (e.g., apply the offset, algorithm, or key) to derive a next GUTI and to use the next GUTI with a paging message or small data transmission.

The subject-matter disclosed herein enable support of the MT-EDT procedure efficiently without incurring additional signaling messages e.g. just for the purpose of acknowledgment of GUTI reallocation while at the same time preserving security by avoiding exposure of the GUTI by using the same multiple times.

The subject-matter disclosed herein also ensures that additional radio/spectrum resources are not wasted due to paging attempts with different GUTI(s).

Exemplary embodiments of the subject-matter disclosed herein will now be described with references to the drawings.

Figure 5:
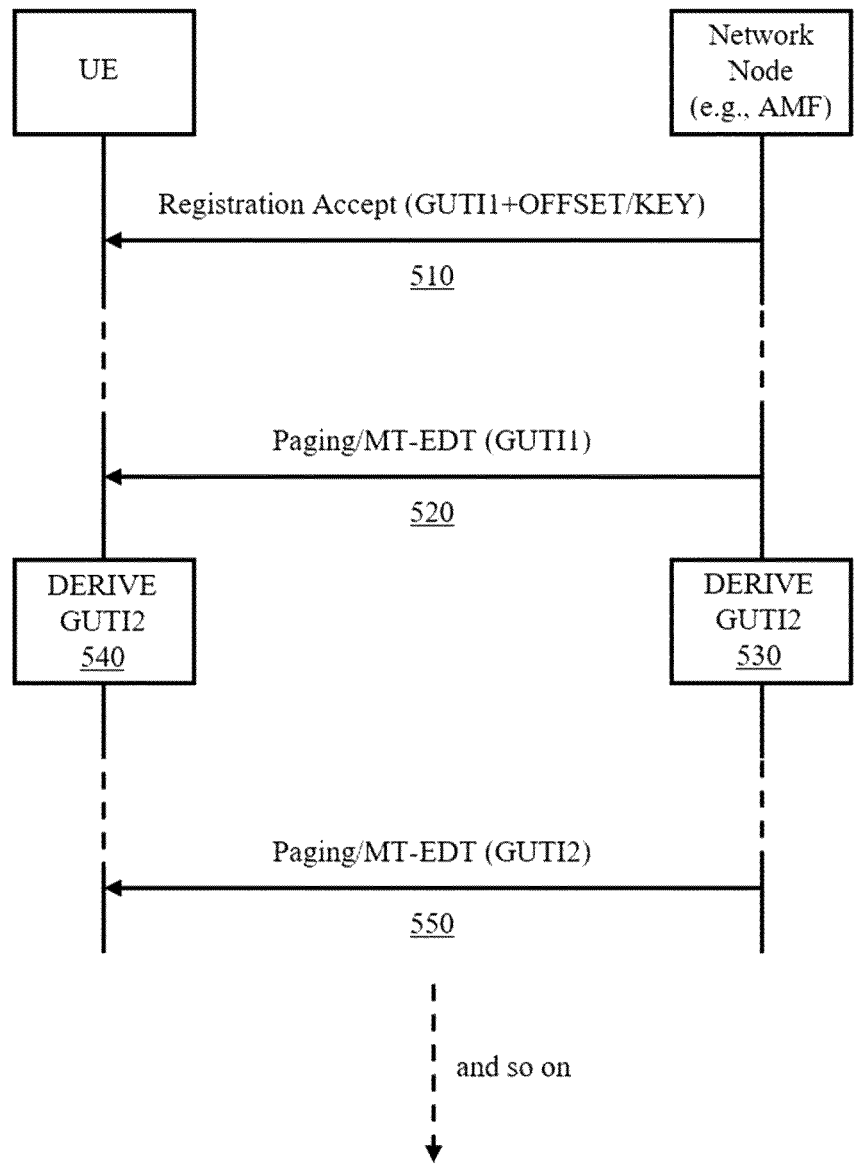
FIGS. 5-7 are flowchart diagrams illustrating a method for performing GUTI reallocation according to some embodiments.

FIG. 5 is a flowchart diagram illustrating a method for reallocating a GUTI.

Aspects of the method of FIG. 5 may be implemented by a wireless device, a base station, a network node and/or a network, such as the UE 120, the BS 110, and/or the network 130 illustrated in and described with respect to various of the drawings, or more generally in conjunction with any of the computer systems or devices shown in the drawings, among other devices, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 510, the network may transmit a message to the UE (e.g., the UE 120 shown in FIG. 1). The message includes a first GUTI (GUTI1) assigned to the UE, and additional information (OFFSET/KEY). In the embodiment shown in FIG. 5, the message is transmitted to the UE by a network node such as Anchor Mobility Function, Access Management Function or Access and Mobility Management Function (e.g., 5G AMF), although it may be transmitted to the UE via any of various entities, such as a BS, access point, etc. Moreover, while the network node is shown in FIG. 5, any of various network entities or functions may perform these steps. Without limitation, the first GUTI may be assigned to the UE by the network or the network node. In some embodiments, also the additional information may be assigned to the UE, allowing, e.g., that different additional information may be used for different UEs. The additional information may comprise an offset value or a TMSI offset/key value used to derive a new GUTI to be assigned to the UE. In 5G systems, the first GUTI may be a 5G-GUTI being structured as described above: <5G-GUTI>=<GUAMI><5G-TMSI>.

In some embodiments, before using the first GUTI, the network may carry out the assignment of the first GUTI to the UE. In some embodiments, together with the GUTI assignment or before, the network may reserve the first GUTI as GUTI for the UE, thereby avoiding that the first GUTI may be used for another UE.

In 520, the network may transmit a first data transmission to the UE. The first data transmission may be any transmission of data to the UE. The first data transmission includes the first GUTI assigned to the UE and transmitted in 510, the first GUTI indicating to the UE that the first data transmission is to be received by the UE (i.e., indicating the UE as receiver of the first data transmission). This may, in some embodiments, be accomplished by the UE comparing the first GUTI transmitted in 510 and received with the first data transmission in 520. In some embodiments, the first data transmission may comprise a message including data to be transmitted to the UE, such as a paging message or a MT-EDT message. The data to be transmitted may be a single data packet whose size fits into a single radio transmission.

In 530, the network may derive a second GUTI (GUTI2) based on the first GUTI and the additional information. The second GUTI may be assigned as the new GUTI to the UE and used for at least one subsequent data transmission (e.g., a next data transmission to be transmitted to the UE). For example, having used the first GUTI for transmitting (i.e., sending) the first data transmission to the UE in 520, the network may derive the second GUTI. The network may start the process of deriving the second GUTI directly after transmitting the first data transmission, or after expiry of a time period. Alternatively, the network may derive the second GUTI after having received from the UE an acknowledgment message.

In some embodiments, together with the second GUTI assignment or before, the network may reserve the second GUTI as next GUTI for the UE, thereby avoiding that the second GUTI may be used for another UE.

On the other hand, in 540, the UE may derive the second GUTI (GUTI2) after having received the first data transmission. Similar to the network in 530, the UE may derive the second GUTI either based on the first GUTI transmitted in 510 or the first GUTI included in the first data transmission 520, and the additional information transmitted in 510.

In 550, the network may transmit a second data transmission to the UE. The second data transmission may be any transmission of data to the UE, similar to the first data transmission (e.g., a paging message or a MT-EDT message). The second data transmission includes the second GUTI (GUTI2) derived in 530 and assigned to the UE. Again, the second GUTI indicates to the UE that the second data transmission is to be received by the UE (i.e., indicating the UE as receiver of the second data transmission). This may, in some embodiments, be accomplished by the UE comparing the second GUTIs transmitted in 550 and derived in 540.

Having used the second GUTI for the second data transmission, the network and the UE may both derive a third GUTI to be assigned to the UE and used for a data transmission subsequent to the second data transmission (e.g., the next data transmission following the second data transmission) based on the second GUTI and the additional information. In some embodiments, together with the third GUTI assignment or before, the network may reserve the third GUTI as next GUTI for the UE, thereby avoiding that the third GUTI may be used for another UE. Thus, the method shown in FIG. 5 may proceed with repeating 530, 540 and 550.

Accordingly, in the method of FIG. 5, the network (e.g., the AMF) and the UE both need to maintain only one GUTI at a time. Data transmissions (e.g., paging messages) are performed using a single GUTI, thereby avoiding to waste radio/spectrum resources. So, in 5G systems, support of MT-EDT messages is enabled without incurring additional signaling just for the purpose of acknowledgement of GUTI reallocation while at the same time preserving security as exposure of the GUTI by using the same GUTI or 5G-S-TMSI multiple times is avoided. This also ensures that additional radio/spectrum resources are not wasted due to paging attempts with different GUTI(s).

Figure 6:
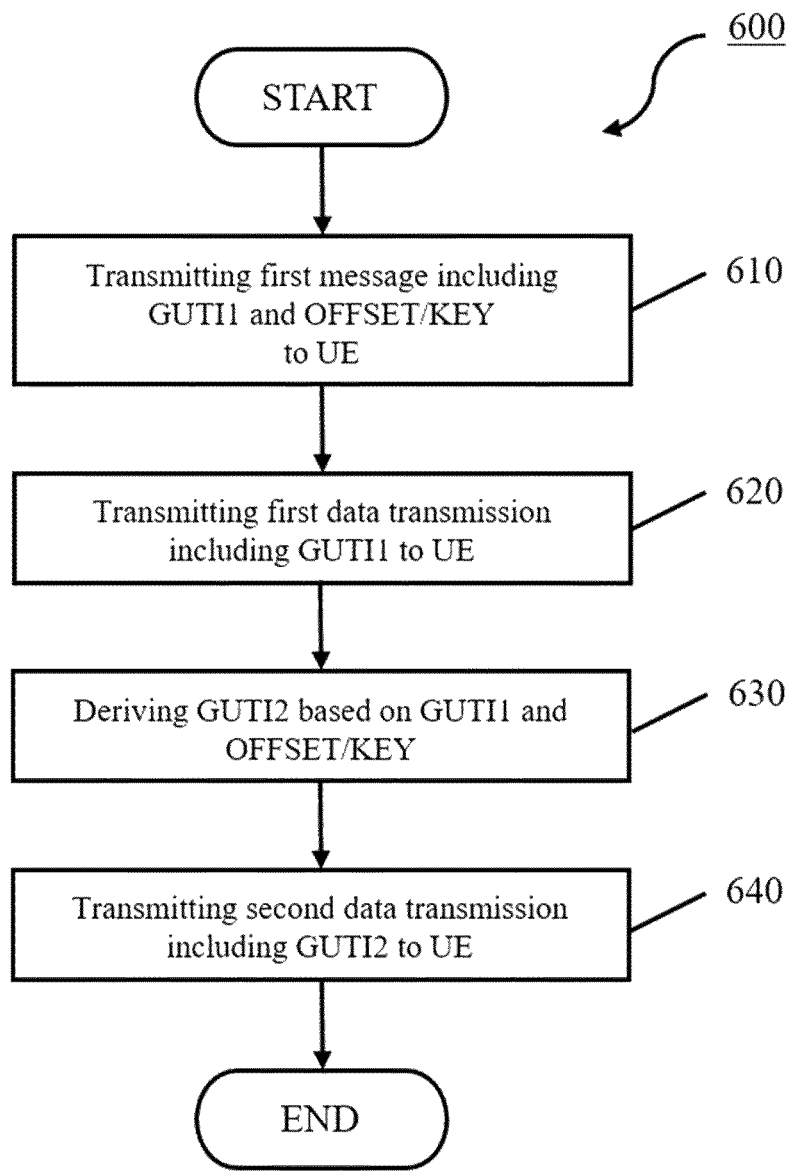

FIG. 6 is a flowchart diagram illustrating the method for reallocating a GUTI, as shown in FIG. 5. The method shown in FIG. 6 may be performed by the network, more specifically by a network node such as Anchor Mobility Function, Access Management Function or Access and Mobility Management Function (e.g., 5G AMF). For example, the method may be performed by the base station 110 as shown in FIG. 1.

In 605, the network may assign a first GUTI to a UE. In some embodiments, together with the first GUTI assignment or before, the network may reserve the first GUTI for the UE, thereby avoiding that the first GUTI may be used for another UE.

In 610, the network may transmit a message to the UE (e.g., the UE 120 shown in FIG. 1). The message may include a first GUTI (GUTI1) and additional information (OFFSET/KEY). The first GUTI may be generated at the network and assigned to the UE. The additional information may comprise an offset value or a TMSI offset/key value used to derive a new GUTI.

In 620, the network may transmit a first data transmission (e.g., a paging message or a MT-EDT message) to the UE. The first data transmission may include the first GUTI (GUTI1) to indicate the UE to which the first GUTI is assigned as receiver. Also, the first data transmission may include the data (e.g., a single data packet whose size fits into a single radio transmission) to be transmitted to the UE.

In 630, the network may derive a second GUTI (GUTI2) based on the first GUTI assigned to the UE and the additional information. In response to deriving, the second GUTI may be assigned to the UE. In some embodiments, together with the second GUTI assignment or before, the network may reserve the second GUTI a next GUTI for the UE, thereby avoiding that the second GUTI may be used for another UE. For example, the second GUTI may replace the first GUTI.

In 640, the network may transmit a second data transmission (e.g., a paging message or a MT-EDT message) to the UE. The second data transmission may include the second GUTI (GUTI2) to indicate the UE to which the second GUTI is assigned as the receiver, and the data to be transmitted to the UE.

According to the method shown in FIG. 6, having used a GUTI for a data transmission (e.g., in response to transmitting a data transmission including a GUTI), the network may derive a new GUTI to be used in a subsequent (next) data transmission (e.g., a next paging message or a next MT-EDT message) to the UE based on the GUTI and the additional information.

Figure 7:
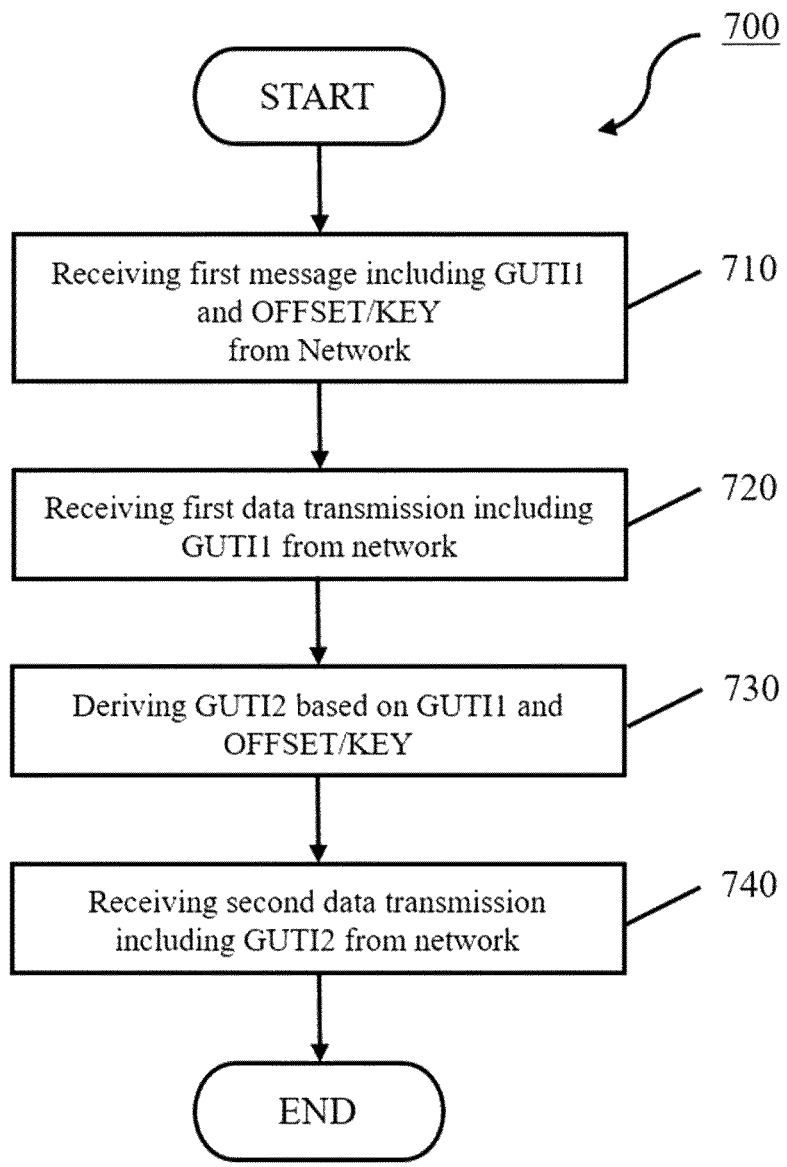

FIG. 7 is a flowchart diagram illustrating the method for reallocating a GUTI, as shown in FIG. 5. The method shown in FIG. 7 may be performed by the UE 120 shown in FIG. 1.

In 710, the UE may receive a message from the network (e.g., a network node, the UE 110 shown in FIG. 1, or a 5G AMF). The message may include a first GUTI (GUTI1) and additional information (OFFSET/KEY). The first GUTI may be generated at the network and assigned to the UE. The additional information may comprise an offset value or a TMSI offset/key value used to derive a new GUTI.

In 720, the UE may receive a first data transmission (e.g., a paging message or a MT-EDT message) from the network. The first data transmission may include the first GUTI (GUTI1) to indicate the UE as receiver. Also, the first data transmission may include data (e.g., a single data packet whose size fits into a single radio transmission).

In 730, having used the first GUTI for the first data transmission (e.g., in response to receiving the first data transmission), the UE may derive a second GUTI (GUTI2) based on the first GUTI received in 710 or 720, and the additional information received in 710. The second GUTI may be assigned to the UE and used for data transmission from the network to the UE.

In 740, the UE may receive a second data transmission (e.g., a paging message or a MT-EDT message) from the network. The second data transmission may include the second GUTI (GUTI2) to indicate the UE as the receiver, and data.

According to the method shown in FIG. 7, having used a GUTI for a data transmission (e.g., in response to a data transmission including a GUTI), the UE may derive a new GUTI to be used in a subsequent (next) data transmission (e.g., a next paging message or a next MT-EDT message) from the network, based on the GUTI and the additional information.

In the above embodiments of the methods for GUTI reallocation, especially when performed in 5G systems, the shortened form of the GUTI (i.e., the 5G-S-TMSI as described above) may be used in data transmissions. That is, in these embodiments, the data transmissions (e.g., the paging message or the MT-EDT message) includes the 5G-S-TMSI instead of the GUTI. As described above, the 5G-GUTI and the 5G-S-TMSI are structured so as to include the 5G-TMSI. In effect, deriving the new (second) GUTI in 530 and 540 of FIG. 5 may include deriving a second 5G-TMSI (as the new 5G-TMSI) based on a first 5G-TMSI and the additional information. In response to transmitting/receiving the first data transmission with the first 5G-S-TMSI in 520 (which includes transmitting/receiving the first 5G-TMSI) the network and UE may derive the second 5G-TMSI based on the first 5G-TMSI and the additional information (e.g., the TMSI offset/key value), thereby manipulating a part of the first 5G-GUTI and the first 5G-S-TMSI and forming the second 5G-GUTI and the second 5G-S-TMSI. In the second data transmission, the second 5G-S-TMSI is then included.

Thus, in the method of FIG. 5, only a part of the 5G-GUTI is manipulated by changing the 5G-TMSI in response to transmitting/receiving data transmissions. Since the 5G-S-TMSI is a shortened version of the 5G-GUTI, also a part of the 5G-S-TMSI used in transmission of paging messages or MT-EDT messages is manipulated.

In some embodiments, the message 510 shown in FIG. 5 may be transmitted during a registration procedure for registering the UE with the network or a update procedure for updating information of the UE at the network.

In particular, the message may be transmitted in response to a registration request transmitted by the UE to the network as part of the registration or initial connection procedure. The registration request may include transmitting a message such as a Registration Request message to the network, but it could be a different message. In these embodiments, the message 510 may include a Registration Accept message. The UE may respond to the Registration Accept message with a Registration Complete message or an acknowledgement message to acknowledge that the (first) GUTI was received (although other types of messages are envisioned).

The message 510 shown in FIG. 5 may be transmitted during the update procedure for updating information of the UE at the network. For example, upon expiry of a timer at the network or upon receiving a message requesting GUTI reallocation (e.g., a configuration update request message, which may have a cause value of "GUTI reallocation") from the UE, the network may provide a new message (e.g., a configuration update command or UE Configuration Update (UCU) message) that indicates a new (first) GUTI for the UE. The message requesting GUTI reallocation may be transmitted by the UE to the network e.g. upon expiry of a timer at the UE. The new (first) GUTI may be derived based on the first GUTI and the additional information as described above, or may be newly generated. Similarly, the new message may also include new additional information. The new additional information may correspond to the additional information transmitted to the UE with the message 510, or may be newly generated at the network. If newly generated, the new additional information may replace the additional information at the network. In some embodiments, the UE may provide a response to the new message (e.g., a configuration update complete message) which may acknowledge the new (first) GUTI. Other types of messages are envisioned.

During the registration or initial connection procedure and the update procedure, the UE may be in a connected state (e.g., in 5G systems a CM-CONNECTED state). The transmission of the messages such as the registration request, the configuration update request message and the configuration update command may wait for the UE entering the connected state, although other triggers are envisaged. The first and/or the second data transmissions are transmitted to and received by the UE during an idle state of the UE (e.g., in 5G system a CM-IDLE state). For example, paging messages and MT-EDT messages may be transmitted to the UE while the UE is in the idle state.

In some embodiments, the additional information included in the message 510 may comprise an offset value used to derive a new GUTI (e.g., the second GUTI) to be assigned to the UE. In deriving the new GUTI (e.g. in 530 and 540 of FIG. 5, in 630 of FIG. 6 and in 730 of FIG. 7), the offset value may be added to the first GUTI. Note that the operation to derive the new GUTI is not limited to addition. Other operations suitable to derive an identifier which uniquely identifies the UE in the network, or at least in parts thereof, may be used. In such embodiments, the additional information may further include an indication of an operation for deriving the new GUTI. The operation may either be selected or chosen from among one or more operations by the network or negotiated with the UE. Examples of operations to derive a new GUTI include applying at least one of an algorithm, a stochastic function, or any other suitable operation. The operation may depend on operations supported by the network and/or the UE. The operation may be indicated to the UE by using one or more bits, coding the operation to be used among the one or more operations. Other suitable implementation for indicating the operation to derive the new GUTI are also envisaged.

In the method of FIG. 5, one or more of the data transmissions (e.g., the first and/or second data transmissions) may further include a new additional information. For example, new additional information may be transmitted to the UE in the first data transmission in 520. The new additional information may replace the additional information transmitted in the message 510 and used in deriving the second GUTI at the network in 530 and the UE in 540. Also, new additional information may be transmitted to the UE in the second data transmission in 550, replacing the new additional information transmitted in the first data transmission and used in deriving the GUTI to be used in a data transmission subsequent to the second data transmission.

The additional information transmitted to the UE (i.e., the additional information in message 510 and the new additional information transmitted in data transmissions) may be scrambled based on an International Mobile Subscriber Identity, IMSI, of the UE. In the method of FIG. 5, the network may determine whether to scramble the additional information to be transmitted to the UE e.g. in accordance with a capability of the UE signaled to the network and a setting at the network. If so, the network may scramble the additional information based on the IMSI of the UE before transmitting the message 510 and/or data transmissions 520, 550. The UE may descramble the scrambled additional information transmitted in the message 510 and/or data transmissions 520, 550 based on the IMSI of the UE to derive the additional information.

In some embodiments, the network may reserve, specifically for the UE, the first GUTI, the second GUTI and/or the additional information prior to transmitting them in the message 510 or data transmission 520 or 550. In one particular example of the method of FIG. 5, the second GUTI may be reserved for the UE prior to transmitting the first data transmission to the UE in 520. For example, the second GUTI may be reserved when transmitting the message including the first GUTI to the UE. The second GUTI is derived based on the first GUTI and the additional information, similar to deriving the second GUTI in 530. Then, in response to transmitting the first data transmission in 520 and/or deriving the second GUTI in 530, the network may reserve a third GUTI derived from the second GUTI and the additional information. The third GUTI is to be used in a subsequent data transmission to the UE (e.g., a data transmission following the second data transmission).

Moreover, in an example of the method shown in FIG. 7, the UE may start a timer in response to receiving the message in 710. The time period may be given or signaled to the UE (e.g., by the message received in 710). In another example, the UE may start the timer in response to transition from the connected to idle state. Other triggers to start the timer are also envisaged. The UE may determine whether to receive the first data transmission (e.g. the paging message or MT-EDT message) including the first GUTI which the UE received with the message in 710. In response to determining that the first data transmission is not received before expiry of the timer (i.e., within the given time period), the UE may transmit a data transmission (e.g., a paging message or MO-EDT message) to the network. The data transmission to the network may include the first GUTI and dummy payload, thereby indicating to the network that the first data transmission was not received by the UE. Also, a data transmission that the UE is going to make to the network (e.g., an MO-EDT) may be used to return the first GUTI to indicate that the first data transmission was not successfully received.

In an example of the method shown in FIG. 7, the network may receive a data transmission including the first GUTI (e.g. a paging message or a MO-EDT message with dummy payload) from the UE. In response to receiving the data transmission, the network may compare the first GUTI included in the data transmission with the GUTI assigned to the UE. In case the first GUTI in the data transmission matches the GUTI assigned to the UE, the network determines that the UE received all data transmissions from the network. Thus, the GUTIs derived at the network and at the UE are synchronized. Otherwise, in case the GUTIs do not match, one or more data transmissions were not received at the UE and the GUTIs are not synchronized. If so, the network may retransmit the first data transmission including the first GUTI to the UE.

Moreover, in the example of the method shown in FIG. 7, the network may release assignment of the second GUTI to the UE in response to determining that one or more data transmissions (e.g., the first data transmission) were not received by the UE. The network may further derive a new second GUTI based on the first GUTI and the additional information in response to retransmitting the first data transmission. The new second GUTI is assigned to the UE and used for the second data transmission.

In another embodiment of the subject-matter disclosed herein, the first GUTI and the additional information transmitted in/received with the first message may be replaced by a list of GUTIs comprising one or more GUTIs assigned to the UE. The UE and the network may then use a first GUTI from the list of GUTIs, e.g., the first GUTI in the list. The network may transmit a first data transmission including the first GUTI and the UE may receive the first data transmission including the first GUTI. Having transmitted/received the first data transmission, the network and the UE may both derive the second GUTI by selecting a GUTI from the list of GUTIs. For example, the network and the UE may select a GUTI following the first GUTI (i.e., the next GUTI) in the list of GUTIs. In the second data transmission, the second GUTI is used. In further examples, instead of using a list including the first GUTI to be used, in may be possible to provide the first GUTI and a list for the other GUTIs.

The following text provide specific embodiments related to 5G, which is not intended to limit any of the other embodiments described herein.

The embodiments described herein may apply to a registration procedure. The UE may need to register with the network to get authorized to receive services, to enable mobility tracking and to enable reachability. The registration procedure may be used when the UE needs to perform an initial registration to the network (e.g., 5G system), mobility registration update upon changing to a new Tracking Area, TA, outside the UE's Registration Area in both CM-CONNECTED and CM-IDLE state, or when the UE needs to update its capabilities or protocol parameters that are negotiated in registration procedure with or without changing to a new TA, or periodic registration update (due to a predefined time period of inactivity). According to the subject-matter described herein, when the network has identified, authenticated and authorized the UE's registration request (or is updating the UE's protocol parameters with UE configuration update procedure), the network assigns in addition to new 5G-GUTI, also additional information such as the 5G-TMSI offset/key value as part of Registration Accept message, as will be described below.

Figure 8:
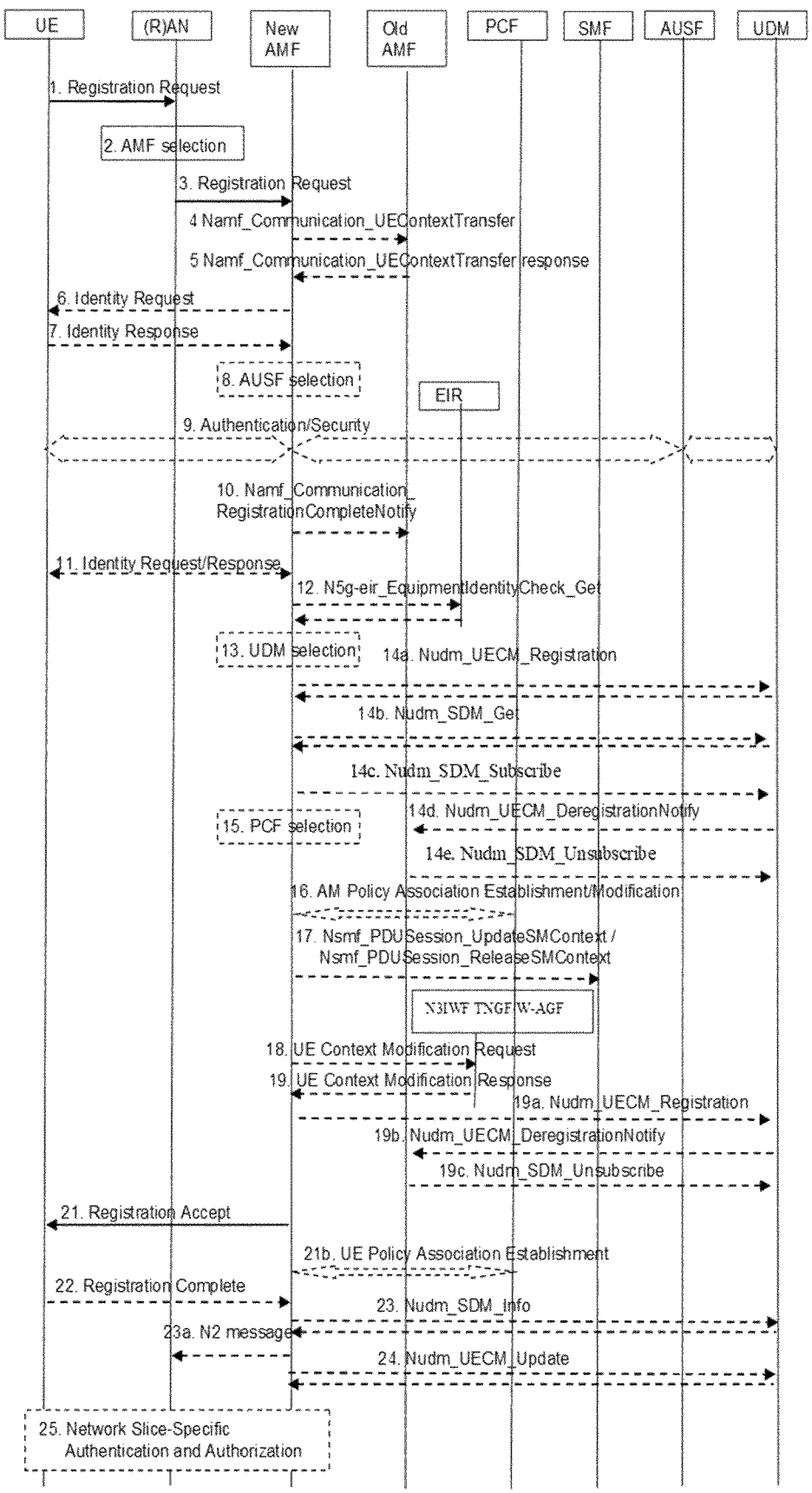
FIG. 8 is a message diagram illustrating an embodiment related to a 5G system.

FIG. 8 illustrates an exemplary registration procedure.

The exemplary registration procedure may be based on the registration procedure as provided by clause 4.2.2.2.2 of TS 23.502. In this registration procedure:

At 1: UE to (R)AN: AN message (AN parameters, Registration Request (Registration type, SUCI or 5G-GUTI or PEI, [last visited TAI (if available)], Security parameters, [Requested NSSAI], [Mapping Of Requested NSSAI], [Default Configured NSSAI Indication], [UE Radio Capability Update], [UE MM Core Network Capability], [PDU Session status], [List Of PDU Sessions To Be Activated], [Follow-on request], [MICO mode preference], [Requested Active Time], [Requested DRX parameters], [extended idle mode DRX parameters], [LADN DNN(s) or Indicator Of Requesting LADN Information], [NAS message container], [Support for restriction of use of Enhanced Coverage], [Preferred Network Behaviour], [UE Policy Container (the list of PSIs, indication of UE support for ANDSP and the operating system identifier)] and [UE Radio Capability ID], PEI)).

NOTE 1: The UE Policy Container and its usage is defined in TS 23.503. In the case of NG-RAN, the AN parameters include e.g. 5G-S-TMSI or GUAMI, the Selected PLMN ID (or PLMN ID and NID, see TS 23.501, clause 5.30) and Requested NSSAI, the AN parameters also include Establishment cause. The Establishment cause provides the reason for requesting the establishment of an RRC connection. Whether and how the UE includes the Requested NSSAI as part of the AN parameters is dependent on the value of the Access Stratum Connection Establishment NSSAI Inclusion Mode parameter, as specified in clause 5.15.9 of TS 23.501. The AN parameters shall include a CAG Identifier if the UE is accessing the NG-RAN using a CAG cell (see TS 23.501 clause 5.30.3).

The AN parameters shall also include an JAB-Indication if the UE is an IAB-node accessing 5GS.

The Registration type indicates if the UE wants to perform an Initial Registration (i.e. the UE is in RM-DEREGISTERED state), a Mobility Registration Update (i.e. the UE is in RM-REGISTERED state and initiates a Registration procedure due to mobility or due to the UE needs to update its capabilities or protocol parameters, or to request a change of the set of network slices it is allowed to use), a Periodic Registration Update (i.e. the UE is in RM-REGISTERED state and initiates a Registration procedure due to the Periodic Registration Update timer expiry, see clause 4.2.2.2.1) or an Emergency Registration (i.e. the UE is in limited service state).

When the UE is using E-UTRA, the UE indicates its support of CIoT 5GS Optimisations, which is relevant for the AMF selection, in the RRC connection establishment signalling associated with the Registration Request.

When the UE is performing an Initial Registration the UE shall indicate its UE identity in the Registration Request message as follows, listed in decreasing order of preference:

i) a 5G-GUTI mapped from an EPS GUTI, if the UE has a valid EPS GUTI.

ii) a native 5G-GUTI assigned by the PLMN to which the UE is attempting to register, if available;

iii) a native 5G-GUTI assigned by an equivalent PLMN to the PLMN to which the UE is attempting to register, if available;

iv) a native 5G-GUTI assigned by any other PLMN, if available.

NOTE 2: This can also be a 5G-GUTIs assigned via another access type.

v) Otherwise, the UE shall include its SUCI in the Registration Request as defined in TS 33.501.

When the UE performing an Initial Registration has both a valid EPS GUTI and a native 5G-GUTI, the UE shall also indicate the native 5G-GUTI as Additional GUTI. If more than one native 5G-GUTIs are available, the UE shall select the 5G-GUTI in decreasing order of preference among items (ii)-(iv) in the list above.

The NAS message container shall be included if the UE is sending a Registration Request message as an Initial NAS message and the UE has a valid 5G NAS security context and the UE needs to send non-cleartext IEs, see clause 4.4.6 in TS 24.501. If the UE does not need to send non-cleartext IEs, the UE shall send a Registration Request message without including the NAS message container.

If the UE does not have a valid 5G NAS security context, the UE shall send the Registration Request message without including the NAS message container. The UE shall include the entire Registration Request message (i.e. containing cleartext IEs and non-cleartext IEs) in the NAS message container that is sent as part of the Security Mode Complete message in step 9b.

When the UE is performing an Initial Registration (i.e., the UE is in RM-DEREGISTERED state) with a native 5G-GUTI then the UE shall indicate the related GUAMI information in the AN parameters. When the UE is performing an Initial Registration with its SUCI, the UE shall not indicate any GUAMI information in the AN parameters.

When the UE is performing an Initial Registration or a Mobility Registration and if CIoT 5GS Optimisations are supported the UE shall indicate its Preferred Network Behaviour (see TS 23.501 clause 5.31.2). If S1 mode is supported the UE's EPC Preferred Network Behaviour is included in the S1 UE network capabilities in the Registration Request message, see TS 24.501, clause 8.2.6.1.

For an Emergency Registration, the SUCI shall be included if the UE does not have a valid 5G-GUTI available; the PEI shall be included when the UE has no SUPI and no valid 5G-GUTI. In other cases, the 5G-GUTI is included and it indicates the last serving AMF.

The UE may provide the UE's usage setting based on its configuration as defined in TS 23.501 clause 5.16.3.7. The UE provides Requested NSSAI as described in TS 23.501 clause 5.15.5.2.1, and in the case of Initial Registration or Mobility Registration Update, the UE includes the Mapping Of Requested NSSAI (if available), which is the mapping of each S-NSSAI of the Requested NSSAI to the HPLMN S-NSSAIs, to ensure that the network is able to verify whether the S-NSSAI(s) in the Requested NSSAI are permitted based on the Subscribed S-NSSAIs.

The UE includes the Default Configured NSSAI Indication if the UE is using a Default Configured NSSAI, as defined in TS 23.501.

In the case of Mobility Registration Update, the UE includes in the List Of PDU Sessions To Be Activated the PDU Sessions for which there are pending uplink data. When the UE includes the List Of PDU Sessions To Be Activated, the UE shall indicate PDU Sessions only associated with the access the Registration Request is related to. As defined in TS 24.501 the UE shall include always-on PDU Sessions which are accepted by the network in the List Of PDU Sessions To Be Activated even if there are no pending uplink data for those PDU Sessions.

NOTE 3: A PDU Session corresponding to a LADN is not included in the List Of PDU Sessions To Be Activated when the UE is outside the area of availability of the LADN.

The UE MM Core Network Capability is provided by the UE and handled by AMF as defined in TS 23.501 clause 5.4.4a. The UE includes in the UE MM Core Network Capability an indication if it supports Request Type flag "handover" for PDN connectivity request during the attach procedure as defined in clause 5.17.2.3.1 of TS 23.501. If the UE supports 'Strictly Periodic Registration Timer Indication', the UE indicates its capability of 'Strictly Periodic Registration Timer Indication' in the UE MM Core Network Capability.

The UE may provide either the LADN DNN(s) or an Indication Of Requesting LADN Information as described in TS 23.501 clause 5.6.5.

If available, the last visited TAI shall be included in order to help the AMF produce Registration Area for the UE.

The Security parameters are used for Authentication and integrity protection, see TS 33.501. Requested NSSAI indicates the Network Slice Selection Assistance Information (as defined in clause 5.15 of TS 23.501). The PDU Session status indicates the previously established PDU Sessions in the UE. When the UE is connected to the two AMFs belonging to different PLMN via 3GPP access and non-3GPP access then the PDU Session status indicates the established PDU Session of the current PLMN in the UE. The Follow-on request is included when the UE has pending uplink signalling and the UE doesn't include List Of PDU Sessions To Be Activated, or the Registration type indicates the UE wants to perform an Emergency Registration. In Initial Registration and Mobility Registration Update, UE provides the UE Requested DRX parameters, as defined in clause 5.4.5 of TS 23.501. The UE may provide the extended idle mode DRX parameters as defined in clause 5.31.7.2 of TS 23.501 to request extended idle mode DRX.

The UE provides UE Radio Capability Update indication as described in TS 23.501.

The UE includes the MICO mode preference and optionally a Requested Active Time value if the UE wants to use MICO Mode with Active Time.

The UE may indicate its Service Gap Control Capability in the UE MM Core Network Capability, see TS 23.501 clause 5.31.16.

For a UE with a running Service Gap timer in the UE, the UE shall not set Follow-on Request indication or Uplink data status in the Registration Request message (see TS 23.501 clause 5.31.16), except for network access for regulatory prioritized services like Emergency services or exception reporting.

If UE supports RACS and has been assigned UE Radio Capability ID(s), the UE shall indicate a UE Radio Capability ID as defined in TS 23.501 clause 5.4.4.1a as non-cleartext IE. The PEI may be retrieved in initial registration from the UE as described in clause 4.2.2.2.1.

At 2: If a 5G-S-TMSI or GUAMI is not included or the 5G-S-TMSI or GUAMI does not indicate a valid AMF the (R)AN, based on (R)AT and Requested NSSAI, if available, selects an AMF.

The (R)AN selects an AMF as described in TS 23.501, clause 6.3.5. If UE is in CM-CONNECTED state, the (R)AN can forward the Registration Request message to the AMF based on the N2 connection of the UE.

If the (R)AN cannot select an appropriate AMF, it forwards the Registration Request to an AMF which has been configured, in (R)AN, to perform AMF selection.

At 3: (R)AN to new AMF: N2 message (N2 parameters, Registration Request (as described in step 1) and [LTE-M Indication].

When NG-RAN is used, the N2 parameters include the Selected PLMN ID (or PLMN ID and NID, see TS 23.501, clause 5.30), Location Information and Cell Identity related to the cell in which the UE is camping, UE Context Request which indicates that a UE context including security information needs to be setup at the NG-RAN.

When NG-RAN is used, the N2 parameters shall also include the Establishment cause, a CAG Identifier if the UE is accessing the NG-RAN using a CAG cell (see TS 23.501 clause 5.30.3) and IAB-Indication if the indication is received in AN parameters in step 1.

Mapping Of Requested NSSAI is provided only if available. If the Registration type indicated by the UE is Periodic Registration Update, then steps 4 to 19 may be omitted.

When the Establishment cause is associated with priority services (e.g. MPS, MCS), the AMF includes a Message Priority header to indicate priority information. Other NFs relay the priority information by including the Message Priority header in service-based interfaces, as specified in TS 29.500.

The RAT Type the UE is using is determined (see clause 4.2.2.2.1) and based on it the AMF determines whether the UE is performing Inter-RAT mobility to or from NB-IoT. If the AMF receives the LTE M indication, then it considers that the RAT Type is LTE-M and stores the LTE-M Indication in UE Context.

If a UE includes a Preferred Network Behaviour, this defines the Network Behaviour the UE supports and is expecting to be available in the network as defined in TS 23.501, clause 5.31.2.

If the UE has included the Preferred Network Behaviour, and what the UE indicated it supports in Preferred Network Behaviour is incompatible with the network support, the AMF shall reject the Registration Request with an appropriate cause value (e.g. one that avoids retries on this PLMN).

If there is a Service Gap timer running in the UE Context in AMF for the UE, and Follow-on Request indication or Uplink data status is included in the Registration Request message, the AMF shall ignore the Follow-on Request indication and Uplink data status and not perform any of the actions related to the status.

If the UE has included a UE Radio Capability ID in step 1 and the AMF supports RACS, the AMF stores the Radio Capability ID in UE context.

At 4: [Conditional] new AMF to old AMF: Namf_Communication_UEContext-Transfer (complete Registration Request) or new AMF to UDSF: Nudsf_Unstructured Data Management_Query( ).

(With UDSF Deployment): If the UE's 5G-GUTI was included in the Registration Request and the serving AMF has changed since last Registration procedure, new AMF and old AMF are in the same AMF Set and UDSF is deployed, the new AMF retrieves the stored UE's SUPI and UE context directly from the UDSF using Nudsf_UnstructuredDataManagement Query service operation or they can share stored UE context via implementation specific means if UDSF is not deployed. This includes also event subscription information by each NF consumer for the given UE. In this case, the new AMF uses integrity protected complete Registration request NAS message to perform and verify integrity protection.

(Without UDSF Deployment): If the UE's 5G-GUTI was included in the Registration Request and the serving AMF has changed since last Registration procedure, the new AMF may invoke the Namf_Communication_UEContext-Transfer service operation on the old AMF including the complete Registration Request NAS message, which may be integrity protected, as well as the Access Type, to request the UE's SUPI and UE Context. See clause 5.2.2.2.2 for details of this service operation. In this case, the old AMF uses either 5G-GUTI and the integrity protected complete Registration request NAS message, or the SUPI and an indication that the UE is validated from the new AMF, to verify integrity protection if the context transfer service operation invocation corresponds to the UE requested. The old AMF also transfers the event subscriptions information by each NF consumer, for the UE, to the new AMF. If the old AMF has not yet reported a non-zero MO Exception Data Counter to the (H-)SMF, the Context Response also includes the MO Exception Data Counter.

If the old AMF has PDU Sessions for another access type (different from the Access Type indicated in this step) and if the old AMF determines that there is no possibility for relocating the N2 interface to the new AMF, the old AMF returns UE's SUPI and indicates that the Registration Request has been validated for integrity protection, but does not include the rest of the UE context.

NOTE 4: The new AMF sets the indication that the UE is validated according to step 9a, in case the new AMF has performed successful UE authentication after previous integrity check failure in the old AMF.

NOTE 5: The NF consumers do not need to subscribe for the events once again with the new AMF after the UE is successfully registered with the new AMF.

If the new AMF has already received UE contexts from the old AMF during handover procedure, then step 4, 5 and 10 shall be skipped.

For an Emergency Registration, if the UE identifies itself with a 5G-GUTI that is not known to the AMF, steps 4 and 5 are skipped and the AMF immediately requests the SUPI from the UE. If the UE identifies itself with PEI, the SUPI request shall be skipped. Allowing Emergency Registration without a user identity is dependent on local regulations.

At 5: [Conditional] old AMF to new AMF: Response to Namf_Communication_UEContext-Transfer (SUPI, UE Context in AMF (as per Table 5.2.2.2.2-1)) or UDSF to new AMF: Nudsf_Unstructured Data Management_Query( ). The old AMF may start an implementation specific (guard) timer for the UE context.

If the UDSF was queried in step 4, the UDSF responds to the new AMF for the Nudsf_Unstructured Data Management_Query invocation with the related contexts including established PDU Sessions, the old AMF includes SMF information DNN, S-NSSAI(s) and PDU Session ID, active NGAP UE-TNLA bindings to N3IWF/TNGF/W-AGF, the old AMF includes information about the NGAP UE-TNLA bindings. If the Old AMF was queried in step 4, Old AMF responds to the new AMF for the Namf_Communication_UEContext-Transfer invocation by including the UE's SUPI and UE Context.

If old AMF holds information about established PDU Session(s), the old AMF includes SMF information, DNN(s), S-NSSAI(s) and PDU Session ID(s).

If old AMF holds UE context established via N3IWF, W-AGF or TNGF, the old AMF includes the CM state via N3IWF, W-AGF or TNGF. If the UE is in CM-CONNECTED state via N3IWF, W-AGF or TNGF, the old AMF includes information about the NGAP UE-TNLA bindings.

If old AMF fails the integrity check of the Registration Request NAS message, the old AMF shall indicate the integrity check failure.

If old AMF holds information about AM Policy Association and the information about UE Policy Association (i.e. the Policy Control Request Trigger for updating UE Policy as defined in TS 23.503), the old AMF includes the information about the AM Policy Association, the UE Policy Association and PCF ID. In the roaming case, V-PCF ID and H-PCF ID are included.

During inter PLMN mobility, the handling of the UE Radio Capability ID in the new AMF is as defined in TS 23.501.

NOTE 6: When new AMF uses UDSF for context retrieval, interactions between old AMF, new AMF and UDSF due to UE signalling on old AMF at the same time is implementation issue.

At 6: [Conditional] new AMF to UE: Identity Request ( ). If the SUCI is not provided by the UE nor retrieved from the old AMF the Identity Request procedure is initiated by AMF sending an Identity Request message to the UE requesting the SUCI.

At 7: [Conditional] UE to new AMF: Identity Response ( ).

The UE responds with an Identity Response message including the SUCI. The UE derives the SUCI by using the provisioned public key of the HPLMN, as specified in TS 33.501.

At 8: The AMF may decide to initiate UE authentication by invoking an AUSF. In that case, the AMF selects an AUSF based on SUPI or SUCI, as described in TS 23.501, clause 6.3.4.

If the AMF is configured to support Emergency Registration for unauthenticated SUPIs and the UE indicated Registration type Emergency Registration, the AMF skips the authentication or the AMF accepts that the authentication may fail and continues the Registration procedure.

At 9a: If authentication is required, the AMF requests it from the AUSF; if Tracing Requirements about the UE are available at the AMF, the AMF provides Tracing Requirements in its request to AUSF. Upon request from the AMF, the AUSF shall execute authentication of the UE. The authentication is performed as described in TS 33.501. The AUSF selects a UDM as described in TS 23.501, clause 6.3.8 and gets the authentication data from UDM.

Once the UE has been authenticated the AUSF provides relevant security related information to the AMF. In case the AMF provided a SUCI to AUSF, the AUSF shall return the SUPI to AMF only after the authentication is successful.

After successful authentication in new AMF, which is triggered by the integrity check failure in old AMF at step 5, the new AMF invokes step 4 above again and indicates that the UE is validated (i.e. through the reason parameter as specified in clause 5.2.2.2.2).

At 9b: If NAS security context does not exist, the NAS security initiation is performed as described in TS 33.501. If the UE had no NAS security context in step 1, the UE includes the full Registration Request message as defined in TS 24.501.

The AMF decides if the Registration Request needs to be rerouted as described in clause 4.2.2.2.3, where the initial AMF refers to the AMF.

At 9c: The AMF initiates NGAP procedure to provide the 5G-AN with security context as specified in TS 38.413 if the 5G-AN had requested for UE Context. Also, if the AMF does not support N26 for EPS interworking and it received UE MM Core Network Capability including an indication that it supports Request Type flag "handover" for PDN connectivity request during the attach procedure as defined in clause 5.17.2.3.1 of TS 23.501, AMF provides an indication "Redirection for EPS fallback for voice is possible" towards 5G-AN as specified in TS 38.413. In addition, if Tracing Requirements about the UE are available at the AMF, the AMF provides the 5G-AN with Tracing Requirements in the NGAP procedure.

At 9d: The 5G-AN stores the security context and acknowledges to the AMF. The 5G-AN uses the security context to protect the messages exchanged with the UE as described in TS 33.501.

At 10: [Conditional] new AMF to old AMF: Namf_Communication_RegistrationCompleteNotify (PDU Session ID(s) to be released due to slice not supported).

If the AMF has changed the new AMF notifies the old AMF that the registration of the UE in the new AMF is completed by invoking the Namf_Communication_RegistrationCompleteNotify service operation.

If the authentication/security procedure fails, then the Registration shall be rejected, and the new AMF invokes the Namf_Communication_RegistrationCompleteNotify service operation with a reject indication reason code towards the old AMF. The old AMF continues as if the UE context transfer service operation was never received.

If one or more of the S-NSSAIs used in the old Registration Area cannot be served in the target Registration Area, the new AMF determines which PDU Session cannot be supported in the new Registration Area. The new AMF invokes the Namf_Communication_RegistrationCompleteNotify service operation including the rejected PDU Session ID and a reject cause (e.g. the S-NSSAI becomes no longer available) towards the old AMF. Then the new AMF modifies the PDU Session Status correspondingly. The old AMF informs the corresponding SMF(s) to locally release the UE's SM context by invoking the Nsmf_PDUSession_ReleaseSMContext service operation.

If new AMF received in the UE context transfer in step 2 the information about the AM Policy Association and the UE Policy Association and decides, based on local policies, not to use the PCF(s) identified by the PCF ID(s) for the AM Policy Association and the UE Policy Association, then it will inform the old AMF that the AM Policy Association and the UE Policy Association in the UE context is not used any longer and then the PCF selection is performed in step 15.

At 11; [Conditional] new AMF to UE: Identity Request/Response (PEI).

If the PEI was not provided by the UE nor retrieved from the old AMF the Identity Request procedure is initiated by AMF sending an Identity Request message to the UE to retrieve the PEI. The PEI shall be transferred encrypted unless the UE performs Emergency Registration and cannot be authenticated.

For an Emergency Registration, the UE may have included the PEI in the Registration Request. If so, the PEI retrieval is skipped.

If the UE supports RACS as indicated in UE MM Core Network Capability, the AMF shall use the PEI of the UE to obtain the TAC for the purpose of RACS operation.

At 12: Optionally the new AMF initiates ME identity check by invoking the N5g-eir_EquipmentIdentityCheck_Get service operation (see clause 5.2.4.2.2).

The PEI check is performed as described in clause 4.7.

For an Emergency Registration, if the PEI is blocked, operator policies determine whether the Emergency Registration procedure continues or is stopped.

At 13: If step 14 is to be performed, the new AMF, based on the SUPI, selects a UDM, then UDM may select a UDR instance. See TS 23.501, clause 6.3.9.

The AMF selects a UDM as described in TS 23.501, clause 6.3.8.

At 14a-c: If the AMF has changed since the last Registration procedure, or if the UE provides a SUPI which doesn't refer to a valid context in the AMF, or if the UE registers to the same AMF it has already registered to a non-3GPP access (i.e. the UE is registered over a non-3GPP access and initiates this Registration procedure to add a 3GPP access), the new AMF registers with the UDM using Nudm_UECM_Registration for the access to be registered (and subscribes to be notified when the UDM deregisters this AMF).

The AMF provides the "Homogenous Support of IMS Voice over PS Sessions" indication (see clause 5.16.3.3 of TS 23.501) to the UDM. The "Homogenous Support of IMS Voice over PS Sessions" indication shall not be included unless the AMF has completed its evaluation of the support of "IMS Voice over PS Session" as specified in clause 5.16.3.2 of TS 23.501.

During initial Registration, if the AMF and UE supports SRVCC from NG-RAN to UTRAN the AMF provides UDM with the UE SRVCC capability.

If the AMF determines that only the UE SRVCC capability has changed, the AMF sends UE SRVCC capability to the UDM.

NOTE 7: At this step, the AMF may not have all the information needed to determine the setting of the IMS Voice over PS Session Supported indication for this UE (see clause 5.16.3.2 of TS 23.501). Hence the AMF can send the "Homogenous Support of IMS Voice over PS Sessions" later on in this procedure.

If the AMF does not have subscription data for the UE, the AMF retrieves the Access and Mobility Subscription data, SMF Selection Subscription data, UE context in SMF data and LCS mobile origination using Nudm_SDM_Get. If the AMF already has subscription data for the UE but the SoR Update Indicator in the UE context requires the AMF to retrieve SoR information depending on the NAS Registration Type ("Initial Registration" or "Emergency Registration") (see Annex C of TS 23.122), the AMF retrieves the Steering of Roaming information using Nudm_SDM_Get. This requires that UDM may retrieve this information from UDR by Nudr_DM_Query. After a successful response is received, the AMF subscribes to be notified using Nudm_SDM_Subscribe when the data requested is modified, UDM may subscribe to UDR by Nudr_DM_Subscribe. The GPSI is provided to the AMF in the Access and Mobility Subscription data from the UDM if the GPSI is available in the UE subscription data. The UDM may provide indication that the subscription data for network slicing is updated for the UE. If the UE is subscribed to MPS in the serving PLMN, "MPS priority" is included in the Access and Mobility Subscription data provided to the AMF. If the UE is subscribed to MCX in the serving PLMN, "MCX priority" is included in the Access and Mobility Subscription data provided to the AMF. The UDM also provides the IAB-Operation allowed indication to AMF as part of the Access and Mobility Subscription data. The AMF shall trigger the setup of the UE context in NG-RAN, or modification of the UE context in NG-RAN if the initial setup is at step 9c, including an indication that the IAB node is authorized.

The new AMF provides the Access Type it serves for the UE to the UDM and the Access Type is set to "3GPP access". The UDM stores the associated Access Type together with the serving AMF and does not remove the AMF identity associated to the other Access Type if any. The UDM may store in UDR information provided at the AMF registration by Nudr_DM_Update.

If the UE was registered in the old AMF for an access, and the old and the new AMFs are in the same PLMN, the new AMF sends a separate/independent Nudm_UECM_Registration to update UDM with Access Type set to access used in the old AMF, after the old AMF relocation is successfully completed.

The new AMF creates an UE context for the UE after getting the Access and Mobility Subscription data from the UDM. The Access and Mobility Subscription data includes whether the UE is allowed to include NSSAI in the 3GPP access RRC Connection Establishment in clear text. The Access and Mobility Subscription data may include Enhanced Coverage Restricted information. If received from the UDM, the AMF stores this Enhanced Coverage Restricted information in the UE context.

The Access and Mobility Subscription data may include the NB-IoT UE Priority.

The subscription data may contain Service Gap Time parameter. If received from the UDM, the AMF stores this Service Gap Time in the UE Context in AMF for the UE.

For an Emergency Registration in which the UE was not successfully authenticated, the AMF shall not register with the UDM.

The AMF enforces the Mobility Restrictions as specified in TS 23.501 clause 5.3.4.1.1. For an Emergency Registration, the AMF shall not check for Mobility Restrictions, access restrictions, regional restrictions or subscription restrictions. For an Emergency Registration, the AMF shall ignore any unsuccessful registration response from UDM and continue with the Registration procedure.

At 14d: When the UDM stores the associated Access Type (e.g. 3GPP) together with the serving AMF as indicated in step 14a, it will cause the UDM to initiate a Nudm_UECM_DeregistrationNotification (see clause 5.2.3.2.2) to the old AMF corresponding to the same (e.g. 3GPP) access, if one exists. If the timer started in step 5 is not running, the old AMF may remove the UE context for the same Access Type. Otherwise, the AMF may remove UE context for the same Access Type when the timer expires. If the serving NF removal reason indicated by the UDM is Initial Registration, then, as described in clause 4.2.2.3.2, the old AMF invokes the Nsmf_PDUSession_ReleaseSMContext (SUPI, PDU Session ID) service operation towards all the associated SMF(s) of the UE to notify that the UE is deregistered from old AMF for the same Access Type. The SMF(s) shall release the PDU Session on getting this notification.

If the old AMF has established an AM Policy Association and a UE Policy Association with the PCF(s), and the old AMF did not transfer the PCF ID(s) to the new AMF (e.g. new AMF is in different PLMN), the old AMF performs an AMF-initiated Policy Association Termination procedure, as defined in clause 4.16.3.2, and performs an AMF-initiated UE Policy Association Termination procedure, as defined in clause 4.16.13.1. In addition, if the old AMF transferred the PCF ID(s) in the UE context but the new AMF informed in step 10 that the AM Policy Association information and UE Policy Association information in the UE context will not be used then the old AMF performs an AMF-initiated Policy Association Termination procedure, as defined in clause 4.16.3.2, and performs an AMF-initiated UE Policy Association Termination procedure, as defined in clause 4.16.13.1.

If the old AMF has an N2 connection for that UE (e.g. because the UE was in RRC Inactive state but has now moved to E-UTRAN or moved to an area not served by the old AMF), the old AMF shall perform AN Release (see clause 4.2.6) with a cause value that indicates that the UE has already locally released the NG-RAN's RRC Connection.

At 14e: [Conditional] If old AMF does not have UE context for another access type (i.e. non-3GPP access), the Old AMF unsubscribes with the UDM for subscription data using Nudm_SDM_unsubscribe.

At 15: If the AMF decides to initiate PCF communication, the AMF acts as follows.

If the new AMF decides to use the (V-)PCF identified by the (V-)PCF ID included in UE context from the old AMF in step 5, the AMF contacts the (V-)PCF identified by the (V)PCF ID to obtain policy. If the AMF decides to perform PCF discovery and selection and the AMF selects a (V-)PCF and may select an H-PCF (for roaming scenario) as described in TS 23.501, clause 6.3.7.1 and according to the V-NRF to H-NRF interaction described in clause 4.3.2.2.3.3.

At 16: [Optional] new AMF performs an AM Policy Association Establishment/Modification. For an Emergency Registration, this step is skipped.

If the new AMF selects a new (V-)PCF in step 15, the new AMF performs AM Policy Association Establishment with the selected (V-)PCF as defined in clause 4.16.1.2.

If the (V-)PCF identified by the (V-)PCF ID included in UE context from the old AMF is used, the new AMF performs AM Policy Association Modification with the (V-)PCF as defined in clause 4.16.2.1.2.

If the AMF notifies the Mobility Restrictions (e.g. UE location) to the PCF for adjustment, or if the PCF updates the Mobility Restrictions itself due to some conditions (e.g. application in use, time and date), the PCF shall provide the updated Mobility Restrictions to the AMF.

If the subscription information includes Tracing Requirements, the AMF provides the PCF with Tracing Requirements.

If the AMF supports DNN replacement, the AMF provides the PCF with the Allowed NSSAI and, if available, the Mapping Of Allowed NSSAI.

If the PCF supports DNN replacement, the PCF provides the AMF with triggers for DNN replacement.

At 17: [Conditional] AMF to SMF: Nsmf_PDUSession_UpdateSMContext ( ). For an Emergency Registered UE (see TS 23.501), this step is applied when the Registration Type is Mobility Registration Update.

The AMF invokes the Nsmf_PDUSession_UpdateSMContext (see clause 5.2.8.2.6) in the following scenario(s):
- If the List Of PDU Sessions To Be Activated is included in the Registration Request in step 1, the AMF sends Nsmf_PDUSession_UpdateSMContext Request to SMF(s) associated with the PDU Session(s) in order to activate User Plane connections of these PDU Session(s). Steps from step 5 onwards described in clause 4.2.3.2 are executed to complete the User Plane connection activation without sending the RRC Inactive Assistance Information and without sending MM NAS Service Accept from the AMF to (R)AN described in step 12 of clause 4.2.3.2. When a User Plane connection for a PDU Session is activated, the AS layer in the UE indicates it to the NAS layer.
- If the AMF has determined in step 3 that the UE is performing Inter-RAT mobility to or from NB-IoT, the AMF sends Nsmf_PDUSession_UpdateSMContext Request to SMF(s) associated with the UEs PDU Session(s), so the SMF(s) can update them according to the "PDU Session continuity at inter RAT mobility" subscription data. Steps from step 5 onwards described in clause 4.2.3.2 are executed without sending MM NAS Service Accept from the AMF to (R)AN described in step 12 of clause 4.2.3.2.

When the serving AMF has changed, the new serving AMF notifies the SMF for each PDU Session that it has taken over the responsibility of the signalling path towards the UE: the new serving AMF invokes the Nsmf_PDUSession_UpdateSMContext service operation using SMF information received from the old AMF at step 5. It also indicates whether the PDU Session is to be re-activated.

NOTE 8: If the UE moves into a different PLMN, the AMF in the serving PLMN can insert or change the V-SMF(s) in the serving PLMN for Home Routed PDU session(s). In this case, the same procedures described in clause 4.23.3 are applied for the V-SMF change as for the I-SMF change (i.e. by replacing the I-SMF with V-SMF). During inter-PLMN change, if the same SMF is used, session continuity can be supported depending on operator policies.

Steps from step 5 onwards described in clause 4.2.3.2 are executed. In the case that the intermediate UPF insertion, removal, or change is performed for the PDU Session(s) not included in "PDU Session(s) to be re-activated", the procedure is performed without N11 and N2 interactions to update the N3 user plane between (R)AN and 5GC.

The AMF invokes the Nsmf_PDUSession_ReleaseSMContext service operation towards the SMF in the following scenario:
- If any PDU Session status indicates that it is released at the UE, the AMF invokes the Nsmf_PDUSession_ReleaseSMContext service operation towards the SMF in order to release any network resources related to the PDU Session.

If the serving AMF is changed, the new AMF shall wait until step 18 is finished with all the SMFs associated with the UE. Otherwise, steps 19 to 22 can continue in parallel to this step.

At 18: [Conditional] If the new AMF and the old AMF are in the same PLMN, the new AMF sends a UE Context Modification Request to N3IWF/TNGF/W-AGF as specified in TS 29.413.

If the AMF has changed and the old AMF has indicated that the UE is in CM-CONNECTED state via N3IWF, W-AGF or TNGF and if the new AMF and the old AMF are in the same PLMN, the new AMF creates an NGAP UE association towards the N3IWF/TNGF/W-AGF to which the UE is connected. This automatically releases the existing NGAP UE association between the old AMF and the N3IWF/TNGF/W-AGF.

At 19: N3IWF/TNGF/W-AGF sends a UE Context Modification Response to the new AMF.

At 19a: [Conditional] After the new AMF receives the response message from the N3IWF, W-AGF or TNGF in step 19, the new AMF registers with the UDM using Nudm_UECM_Registration as step 14a, but with the Access Type set to "non-3GPP access". The UDM stores the associated Access Type together with the serving AMF and does not remove the AMF identity associated to the other Access Type if any. The UDM may store in UDR information provided at the AMF registration by Nudr_DM_Update.

At 19b: [Conditional] When the UDM stores the associated Access Type (i.e. non-3GPP) together with the serving AMF as indicated in step 19a, it will cause the UDM to initiate a Nudm_UECM_DeregistrationNotification (see clause 5.2.3.2.2) to the old AMF corresponding to the same (i.e. non-3GPP) access. The old AMF removes the UE context for non-3GPP access.

At 19c: The Old AMF unsubscribes with the UDM for subscription data using Nudm_SDM_unsubscribe.

At 20a: Void.

At 21: New AMF to UE: Registration Accept (5G-GUTI, Registration Area, [Mobility restrictions], [PDU Session status], [Allowed NSSAI], [Mapping Of Allowed NSSAI], [Configured NSSAI for the Serving PLMN], [Mapping Of Configured NSSAI], [rejected S-NSSAIs], [Pending NSSAI], [Periodic Registration Update timer], [Active Time], [Strictly Periodic Registration Timer Indication], [LADN Information], [accepted MICO mode], [IMS Voice over PS session supported Indication], [Emergency Service Support indicator], [Accepted DRX parameters], [extended idle mode DRX parameters], [Paging Time Window], [Network support of Interworking without N26], [Access Stratum Connection Establishment NSSAI Inclusion Mode], [Network Slicing Subscription Change Indication], [Operator-defined access category definitions], [List of equivalent PLMNs], [Enhanced Coverage Restricted information], [Supported Network Behaviour], [Service Gap Time], [PLMN-assigned UE Radio Capability ID], [PLMN-assigned UE Radio Capability ID deletion]).

If the Requested NSSAI does not include S-NSSAIs which map to S-NSSAIs of the HPLMN subject to Network Slice-Specific Authentication and Authorization and the AMF determines that no S-NSSAI can be provided in the Allowed NSSAI for the UE in the current UE's Tracking Area and if no default S-NSSAI(s) not yet involved in the current UE Registration procedure could be further considered, the AMF shall reject the UE Registration and shall include in the rejection message the list of Rejected S-NSSAIs, each of them with the appropriate rejection cause value.

The Allowed NSSAI for the Access Type for the UE is included in the N2 message carrying the Registration Accept message. The Allowed NSSAI contains only S-NSSAIs that do not require, based on subscription information, Network Slice-Specific Authentication and Authorization, or based on the UE Context in the AMF, those S-NSSAIs for which Network Slice-Specific Authentication and Authorization previously succeeded, regardless of the Access Type.

If the UE has indicated its support for Network Slice-Specific Authentication and Authorization procedure in the UE MM Core Network Capability in the Registration Request, AMF includes in the Pending NSSAI the S-NSSAIs that map to an S-NSSAI of the HPLMN which in the subscription information has indication that it is subject to Network Slice-Specific Authentication and Authorization, as described in clause 4.6.2.4 of TS 24.501. In such case, the AMF then shall trigger at step 25 the Network Slice-Specific Authentication and Authorization procedure, specified in clause 4.2.9.2, except, based on Network policies, for those S-NSSAIs for which Network Slice-Specific Authentication and Authorization have already been initiated on another Access Type for the same S-NSSAI(s). The UE shall not attempt re-registration with the S-NSSAIs included in the list of Pending NSSAIs until the Network Slice-Specific Authentication and Authorization procedure has been completed, regardless of the Access Type.

If no S-NSSAI can be provided in the Allowed NSSAI because:
- all the S-NSSAI(s) in the Requested NSSAI are to be subject to Network Slice-Specific Authentication and Authorization; or
- no Requested NSSAI was provided or none of the S-NSSAIs in the Requested NSSAI matches any of the Subscribed S-NSSAIs, and all the S-NSSAI(s) marked as default in the Subscribed S-NSSAIs are to be subject to Network Slice-Specific Authentication and Authorization.

The AMF shall provide an empty Allowed NSSAI. Upon receiving an empty Allowed NSSAI and a Pending NSSAI, the UE is registered in the PLMN but shall wait for the completion of the Network Slice-Specific Authentication and Authorization procedure without attempting to use any service provided by the PLMN except emergency services (the AMF assigns the Tracking Areas of the Registration Area as a Non-Allowed Area).

The AMF stores the NB-IoT Priority retrieved in Step 14 and associates it to the 5G-S-TMSI allocated to the UE.

The AMF sends a Registration Accept message to the UE indicating that the Registration Request has been accepted. 5G-GUTI is included if the AMF allocates a new 5G-GUTI. If the UE is already in RM-REGISTERED state via another access in the same PLMN, the UE shall use the 5G-GUTI received in the Registration Accept for both registrations. If no 5G-GUTI is included in the Registration Accept, then the UE uses the 5G-GUTI assigned for the existing registration also for the new registration. If the AMF allocates a new Registration area, it shall send the Registration area to the UE via Registration Accept message. If there is no Registration area included in the Registration Accept message, the UE shall consider the old Registration Area as valid. Mobility Restrictions is included in case mobility restrictions applies for the UE and Registration Type is not Emergency Registration. The AMF indicates the established PDU Sessions to the UE in the PDU Session status. The UE removes locally any internal resources related to PDU Sessions that are not marked as established in the received PDU Session status. If the AMF invokes the Nsmf_PDUSession_UpdateSMContext procedure for UP activation of PDU Session(s) in step 18 and receives rejection from the SMF, then the AMF indicates to the UE the PDU Session ID and the cause why the User Plane resources were not activated. When the UE is connected to the two AMFs belonging to different PLMN via 3GPP access and non-3GPP access then the UE removes locally any internal resources related to the PDU Session of the current PLMN that are not marked as established in received PDU Session status. If the PDU Session status information was in the Registration Request, the AMF shall indicate the PDU Session status to the UE. The Allowed NSSAI provided in the Registration Accept is valid in the Registration Area and it applies for all the PLMNs which have their Tracking Areas included in the Registration Area. The Mapping Of Allowed NSSAI is the mapping of each S-NSSAI of the Allowed NSSAI to the HPLMN S-NSSAIs. The Mapping Of Configured NSSAI is the mapping of each S-NSSAI of the Configured NSSAI for the Serving PLMN to the HPLMN S-NSSAIs. The AMF shall include in the Registration Accept message the LADN Information for the list of LADNs, described in TS 23.501 clause 5.6.5, that are available within the Registration area determined by the AMF for the UE. The AMF may include Operator-defined access category definitions to let the UE determine the applicable Operator-specific access category definitions as described in TS 24.501.

If the UE included MICO mode in the Registration Request, then AMF responds in the Registration Accept message whether MICO mode should be used. When MICO mode is allowed for the UE, the AMF may include an Active Time value and/or Strictly Periodic Registration Timer Indication in the Registration Accept message. The AMF determines the Periodic Registration Update timer value, Active Time value and the Strictly Periodic Registration Timer Indication based on local configuration, Expected UE Behaviour if available, UE indicated preferences, UE capability, UE subscription information and network policies, or any combination of them so as to enable UE power saving, as described in TS 23.501, clause 5.31.7. The AMF determines to apply the Strictly Periodic Registration Timer Indication to the UE if the UE indicates its capability of the Strictly Periodic Registration Timer Indication in the registration request message, as described in step 1. If the AMF provides the Periodic Registration Update timer value with the Strictly Periodic Registration Timer Indication to the UE, the UE and the AMF start the Periodic Registration Update timer after this step, as described in TS 23.501, clause 5.31.7.5.

In the case of registration over 3GPP access, the AMF sets the IMS Voice over PS session supported Indication as described in clause 5.16.3.2 of TS 23.501. In order to set the IMS Voice over PS session supported Indication the AMF may need to perform the UE Capability Match Request procedure in clause 4.2.8a to check the compatibility of the UE and NG-RAN radio capabilities related to IMS Voice over PS. If the AMF hasn't received Voice Support Match Indicator from the NG-RAN on time then, based on implementation, AMF may set IMS Voice over PS session supported Indication and update it at a later stage.

In the case of registration over non-3GPP access, the AMF sets the IMS Voice over PS session supported Indication as described in clause 5.16.3.2a of TS 23.501.

The Emergency Service Support indicator informs the UE that emergency services are supported, i.e. the UE is allowed to request PDU Session for emergency services. If the AMF received "MPS priority" from the UDM as part of Access and Mobility Subscription data, based on operator policy, "MPS priority" is included in the Registration Accept message to the UE to inform the UE whether configuration of Access Identity 1 is valid within the selected PLMN, as specified in TS 24.501. If the AMF received "MCX priority" from the UDM as part of Access and Mobility Subscription data, based on operator policy and UE subscription to MCX Services, "MCX priority" is included in the Registration Accept message to the UE to inform the UE whether configuration of Access Identity 2 is valid within the selected PLMN, as specified in TS 24.501. The Accepted DRX parameters are defined in clause 5.4.5 of TS 23.501. The AMF sets the Network support of Interworking without N26 parameter as described in clause 5.17.2.3.1 of TS 23.501. If the AMF accepts the use of extended idle mode DRX, the AMF includes the extended idle mode DRX parameters and Paging Time Window as described in 5.31.7.2 of TS 23.501.

If the UDM intends to indicate the UE that subscription has changed, the Network Slicing Subscription Change Indication is included. If the AMF includes Network Slicing Subscription Change Indication, then the UE shall locally erase all the network slicing configuration for all PLMNs and, if applicable, update the configuration for the current PLMN based on any received information.

The Access Stratum Connection Establishment NSSAI Inclusion Mode, as specified in TS 23.501 clause 5.15.9, is included to instruct the UE on what NSSAI, if any, to include in the Access Stratum connection establishment. The AMF can set the value to modes of operation a, b, c defined in TS 23.501 clause 5.15.9 in the 3GPP Access only if the Inclusion of NSSAI in RRC Connection Establishment Allowed indicates that it is allowed to do so.

For a UE registered in a PLMN, the AMF may provide a List of equivalent PLMNs which is handled as specified in TS 24.501. For a UE registered in an SNPN, the AMF shall not provide a list of equivalent PLMNs to the UE.

If the UE included support for restriction of use of Enhanced Coverage in step 1, the AMF sends the Enhanced Coverage Restricted information to the NG-RAN in N2 message. The AMF also sends Enhanced Coverage Restricted information to the UE in the Registration Accept message.

If the UE receives Enhanced Coverage Restricted information in the Registration Accept message, the UE shall store this information and shall use the value of Enhanced Coverage Restricted information to determine if Enhanced Coverage feature should be used or not.

If the UE and the AMF have negotiated to enable MICO mode and the AMF uses the Extended connected timer, then the AMF provides the Extended Connected time value to NG-RAN (see clause 5.31.7.3 of TS 23.501) in this step. The Extended Connected Time value indicates the minimum time the RAN should keep the UE in RRC-CONNECTED state regardless of inactivity.

The AMF indicates the CIoT 5GS Optimisations it supports and accepts in the Supported Network Behaviour information (see TS 23.501, clause 5.31.2) if the UE included Preferred Network Behaviour in its Registration Request.

The AMF may steer the UE from 5GC by rejecting the Registration Request. The AMF should take into account the Preferred and Supported Network Behaviour (see TS 23.501, clause 5.31.2) and availability of EPC to the UE before steering the UE from 5GC.

If the AMF accepts MICO mode and knows there may be mobile terminated data or signalling pending, the AMF maintains the N2 connection for at least the Extended Connected Time as described in clause 5.31.7.3 of TS 23.501, and provides the Extended Connected Time value to the RAN.

The AMF includes Service Gap Time if Service Gap Time is present in the subscription information (steps 14a-c) or the Service Gap Time has been updated by the Subscriber Data Update Notification to AMF procedure (see clause 4.5.1) and the UE has indicated UE Service Gap Control Capability.

If the UE receives a Service Gap Time in the Registration Accept message, the UE shall store this parameter and apply Service Gap Control (see TS 23.501 clause 5.31.16).

When the UE and the AMF supports RACS as defined in TS 23.501 clause 5.4.4.1a, and the AMF needs to configure the UE with a UE Radio Capability ID, and the AMF already has the UE radio capabilities other than NB-IoT radio capabilities for the UE, the AMF may provide the UE with the UE Radio Capability ID for the UE radio capabilities the UCMF returns to the AMF in a Nucmf_assign service operation for this UE. Alternatively, when the UE and the AMF support RACS, the AMF may provide the UE with an indication to delete any PLMN-assigned UE Radio Capability ID in this PLMN (see TS 23.501 clause 5.4.4.1a).

At 21b: [Optional] The new AMF performs a UE Policy Association Establishment as defined in clause 4.16.11. For an Emergency Registration, this step is skipped.

The new AMF sends a Npcf_UEPolicyControl Create Request to PCF. PCF sends a Npcf_UEPolicyControl Create Response to the new AMF.

PCF triggers UE Configuration Update Procedure as defined in clause 4.2.4.3.

At 22: [Conditional] UE to new AMF: Registration Complete ( ).

The UE sends a Registration Complete message to the AMF when it has successfully updated itself after receiving any of the [Configured NSSAI for the Serving PLMN], [Mapping Of Configured NSSAI] and a Network Slicing Subscription Change Indication in step 21. The UE sends a Registration Complete message to the AMF to acknowledge if a new 5G-GUTI was assigned.

If new 5G-GUTI was assigned, then the UE passes the new 5G-GUTI to its 3GPP access' lower layer when a lower layer (either 3GPP access or non-3GPP access) indicates to the UE's RM layer that the Registration Complete message has been successfully transferred across the radio interface.

NOTE 9: The above is needed because the NG-RAN may use the RRC Inactive state and a part of the 5G-GUTI is used to calculate the Paging Frame (see TS 38.304 and TS 36.304). It is assumed that the Registration Complete is reliably delivered to the AMF after the 5G-AN has acknowledged its receipt to the UE.

When the List Of PDU Sessions To Be Activated is not included in the Registration Request and the Registration procedure was not initiated in CM-CONNECTED state, the AMF releases the signalling connection with UE, according to clause 4.2.6.

When the Follow-on request is included in the Registration Request, the AMF should not release the signalling connection after the completion of the Registration procedure.

If the AMF is aware that some signalling is pending in the AMF or between the UE and the 5GC, the AMF should not release the signalling connection immediately after the completion of the Registration procedure.

If PLMN-assigned UE Radio Capability ID is included in step 21, the AMF stores the PLMN-assigned UE Radio Capability ID in UE context if receiving Registration Complete message.

If the UE receives PLMN-assigned UE Radio Capability ID deletion indication in step 21, the UE shall delete the PLMN-assigned UE Radio Capability ID(s) for this PLMN.

At 23: [Conditional] AMF to UDM: If the Access and Mobility Subscription data provided by UDM to AMF in 14b includes Steering of Roaming information with an indication that the UDM requests an acknowledgement of the reception of this information from the UE, the AMF provides the UE acknowledgement to UDM using Nudm_SDM_Info. For more details regarding the handling of Steering of Roaming information refer to TS 23.122.

At 23a: For Registration over 3GPP Access, if the AMF does not release the signalling connection, the AMF sends the RRC Inactive Assistance Information to the NG-RAN. For Registration over non-3GPP Access, if the UE is also in CM-CONNECTED state on 3GPP access, the AMF sends the RRC Inactive Assistance Information to the NG-RAN. The AMF also uses the Nudm_SDM_Info service operation to provide an acknowledgment to UDM that the UE received the Network Slicing Subscription Change Indication (see step 21 and step 22) and acted upon it.

At 24: [Conditional] AMF to UDM: After step 14a, and in parallel to any of the preceding steps, the AMF shall send a "Homogeneous Support of IMS Voice over PS Sessions" indication to the UDM using Nudm_UECM_Update:

If the AMF has evaluated the support of IMS Voice over PS Sessions, see clause 5.16.3.2 of TS 23.501, and If the AMF determines that it needs to update the Homogeneous Support of IMS Voice over PS Sessions, see clause 5.16.3.3 of TS 23.501.

At 25: [Conditional] If the UE indicates its support for Network Slice-Specific Authentication and Authorization procedure in the UE MM Core Network Capability in Registration Request, and any S-NSSAI of the HPLMN is subject to Network Slice-Specific Authentication and Authorization, the related procedure is executed at this step (see clause 4.2.9.1). Once the Network Slice-Specific Authentication and Authorization procedure is completed for all S-NSSAIs, the AMF shall trigger a UE Configuration Update procedure to deliver an Allowed NSSAI containing also the S-NSSAIs for which the Network Slice-Specific Authentication and Authorization was successful, and include any rejected NSSAIs with an appropriate rejection cause value.

The AMF shall remove the mobility restriction if the Tracking Areas of the Registration Area were previously assigned as a Non-Allowed Area due to pending Network Slice-Specific Authentication and Authorization.

The AMF stores an indication in the UE context for any S-NSSAI of the HPLMN subject to Network Slice-Specific Authentication and Authorization for which the Network Slice-Specific Authentication and Authorization succeeds.

Once completed the Network Slice-Specific Authentication and Authorization procedure, if the AMF determines that no S-NSSAI can be provided in the Allowed NSSAI for the UE, which is already authenticated and authorized successfully by a PLMN, and if no default S-NSSAI(s) could be further considered, the AMF shall execute the Network-initiated Deregistration procedure described in clause 4.2.2.3.3, and shall include in the explicit De-Registration Request message the list of Rejected S-NSSAIs, each of them with the appropriate rejection cause value.

According to the an exemplary registration procedure, the UE may indicate to the network (e.g., the AMF) its 5G-GUTI offset capability in Registration Request message, at 1. The 5G-GUTI offset capability indicate to the AMF that the UE supports deriving the second GUTI based on the first GUTI and the additional information. So, the Registration Request message may further include information indicating the 5G-GUTI offset capability. If the UE indicated its 5G-GUTI offset capability, the AMF may assign the additional information (e.g., the offset value or the 5G-TMSI offset/key value) as part of Registration Accept message. In the Registration Complete message, the UE may acknowledge that the UE has received both the GUTI assigned to the UE and the additional information (e.g. the 5G-TMSI offset/key value).

Furthermore, at step 21 of the exemplary registration procedure, the new AMF may provide to the UE: Registration Accept (5G-GUTI, Registration Area, [Mobility restrictions], [PDU Session status], [Allowed NSSAI], [Mapping Of Allowed NSSAI], [Configured NSSAI for the Serving PLMN], [Mapping Of Configured NSSAI], [rejected S-NSSAIs], [Pending NSSAI], [Periodic Registration Update timer], [Active Time], [Strictly Periodic Registration Timer Indication], [LADN Information], [accepted MICO mode], [IMS Voice over PS session supported Indication], [Emergency Service Support indicator], [Accepted DRX parameters], [extended idle mode DRX parameters], [Paging Time Window], [Network support of Interworking without N26], [Access Stratum Connection Establishment NSSAI Inclusion Mode], [Network Slicing Subscription Change Indication], [Operator-defined access category definitions], [List of equivalent PLMNs], [Enhanced Coverage Restricted information], [Supported Network Behaviour], [Service Gap Time], [PLMN-assigned UE Radio Capability ID], [PLMN-assigned UE Radio Capability ID deletion], [Additional information such as 5G-TMSI offset/key value]).

In the exemplary registration procedure shown in FIG. 8, the UE and AMF use the assigned 5G-TMSI to derive 5G-S-TMSI for the first paging. After successful paging, the UE and AMF derive the next 5G-S-TMSI using the assigned 5G-TMSI offset/key value. Any paging failure does not change 5G-S-TMSI for UE or AMF. If no NAS signaling except for EDT occurs, the AMF may reassign new 5G-GUTI (and 5G-TMSI offset/key value).

Figure 9:
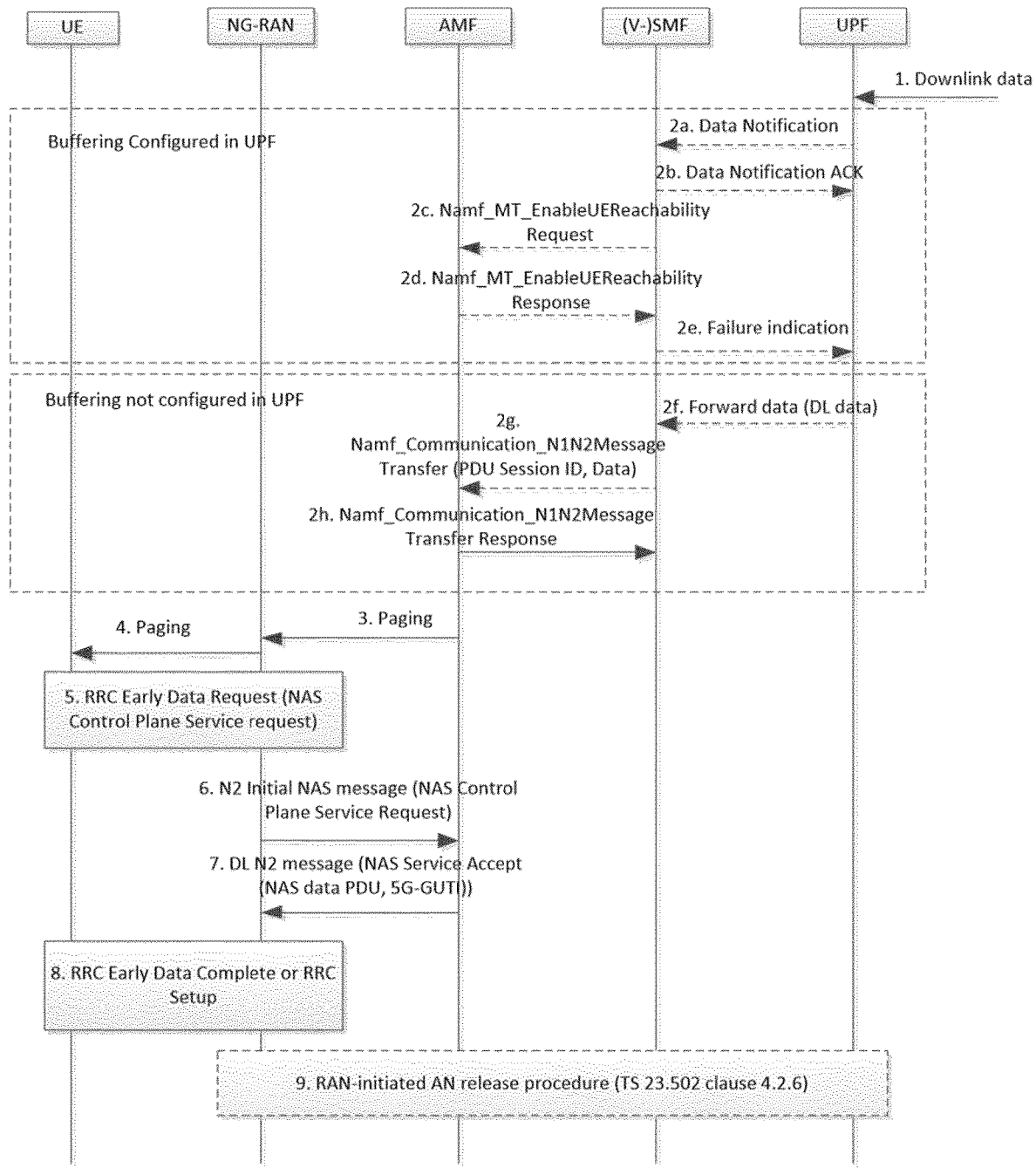
FIG. 9 is a message diagram illustrating an approach of a method for assigning new 5G-GUTI without connection establishment.

FIG. 9 illustrates a method for assigning a new 5G-GUTI without connection establishment.

The method of FIG. 9 proposed in Change Request CR 1848 rev 6 for TS 23.502 Version 16.3.0, submitted as document S2-2000264.

Steps 1 to step 4 are the same as the Mobile Terminated Data Transport in Control Plane CIoT 5GS Optimisation in clause 4.24.2 from step 1 to step 4 with the following differences:

Step 2a: UPF may send the downlink packet size to the SMF for MT-EDT if the downlink data is applicable for User Plane optimization and MT-EDT is enabled for this PDN session.

Step 2c: When the DL data received in step 2a, SMF includes the DL data in Namf_MT_EnableUEReachability Request message sent to AMF.

Step 3: When the DL data received either in step 2c or 2g, AMF detects whether it is preferred to initiate the MT-EDT procedure by using the MT-EDT support information in UE MM Core Network Capability, expected UE behaviour parameters that received from UDM as part of the UE's subscription info and local policy.

If AMF decides that is appropriate to initiate MT-EDT procedure, the AMF includes the DL packet size in the N2 paging message.

Step 4: Based upon the received DL packet size NG-RAN determines whether to initiate MT-EDT transmission as defined in TS 38.300. The NG-RAN sends the paging message to the UE with an MT-EDT indication.

After the UE receives a paging with MT-EDT indication, UE initiates the MO EDT procedure for Control Plane CIoT EPS optimizations which is described in clause 4.24.1.

Steps 5 to step 9 are the same as UPF anchored Mobile Originated Data Transport in Control Plane CIoT 5GS Optimisation described in clause 4.24.1 with the following differences:

Step 7: AMF allocates a new 5G-GUTI and transmits along with NAS data PDU within the NAS Service Accept message. The NAS Service Accept is included in DL N2 message sent from AMF to NG-RAN. The AMF considers both the new 5G-GUTI and the old 5G-GUTI valid until any subsequent UE NAS signalling using the new 5G-GUTI, in which case the AMF considers the old 5G-GUTI invalid.

If AMF does not expect any other data or signalling with the UE, the AMF sends the DL N2 message by including the DL data and End Indication to indicate that no further data or signalling is expected with UE. If AMF determines more data or signalling may be pending, the AMF sends an N2 signalling without End indication as described in step 3a in clause 4.24.1.

Step 8: The NAS container is included in RRC message sent to the UE. If the RRC Early data message is received in step 8, UE will store the new 5G-GUTI without send NAS response message.

In this method, it is possible that the UE may not receive the new 5G-GUTI contained in the last message and enters idle mode after message 7 is lost. To mitigate this problem caused by 5G-GUTI being out of synchronization between UE and AMF, the paging procedure was modified as follows: The AMF may page the UE with new 5G-GUTI as first step. If it is not reachable after multiple attempts, AMF may try to page the UE with the old 5G-GUTI to reach the UE. The drawback is that both network signaling load and radio interface load for paging increases significantly in case of such failures. AMF may also need to try with old 5G-GUTI in case of normal failures of paging escalations also. Due to AMF paging escalation, the increased use of signaling and radio interface resources is not restricted to the UEs last serving cell.

In an embodiment of the method of FIG. 9 which mitigates additional network signaling for paging escalation is: If the UE does not receive the message Msg4 in step 8 after having responded to paging in step 5, the UE knows the reception of the intended MT-EDT payload has failed. The UE may then start timer to wait for any uplink MO-EDT transmission. Otherwise, the UE may trigger MO-EDT signaling procedure with dummy payload after the timer expiry. Reception of this message with old 5G-GUTI at AMF will indicate that the UE did not receive the new 5G-GUTI sent via MT-EDT procedure.

So, if the UE did not receive MT-EDT payload in response to paging response, the UE may initiate MO-EDT procedure with dummy payload or establishment cause (indicating reporting mismatch) to inform AMF about the same. The AMF, after receiving MO data with the old 5G-S-TMSI reverses back to previous 5G-GUTI in the sequence.

Figure 10:
FIG. 10 is a message diagram illustrating another approach of a method for assigning new 5G-GUTI.

FIG. 10 illustrates another method for assigning a new 5G-GUTI without connection establishment. FIG. 10 is also based on the Change Request CR 1848 rev 6 for TS 23.502 Version 16.3.0, submitted as document S2-2000264.

The method shown in FIG. 10 provide another solution for the following 5G MT-EDT challenges. According to the SA3 requirements, the same 5G-S-TMSI value shall be used for paging only once. The 5G-GUTI re-assignment is designed for NAS level acknowledgement to ensure the UE has received the newly assigned 5G-GUTI. So, re-use of 5G-S-TMSI violates SA3 requirement by opening up a privacy threat, and re-assignment of 5G-GUTI without NAS acknowledgement is not acceptable, as it risks out of synchronization situation between UE and AMF. Moreover, another challenge concerns recovery via fallback to old 5G-GUTI without wasting paging resources, such as paging with 5G-GUTI_1 in previous serving cell (incl. paging repetitions), paging with 5G-GUTI_1 in neighbor cells and eventually across all cells supported by AMF (including paging repetitions in all steps), paging with 5G-GUTI_2 in previous serving cell (incl. paging repetitions), paging with 5G-GUTI_2 in neighbor cells and eventually across all cells supported by AMF (including paging repetitions in all steps). Finally, MT-EDT followed by immediate 5G-GUTI re-assignment and NAS level acknowledgement eliminates the signaling optimization of MT-EDT.

As in S2-2000264, the UE indicates its 5G-GUTI offset capability in Registration Request. If the UE has indicated 5G-GUTI offset capability, the AMF may assign 5G-GUTI and 5G-TMSI offset as part of Registration Accept. The Registration Complete acknowledges that the UE has received both 5G-GUTI and 5G-TMSI offset. The use of the 5G-TMSI offset is as follows: UE and AMF may use the assigned 5G-TMSI to derive 5GS-TMSI for the first paging, the Service Request procedure may confirm the derivation of the next 5G-S-TMSI using the assigned 5G-TMSI offset, any paging failure does not change 5G-S-TMSI in UE or AMF, and the AMF may re-assign new 5G-GUTI (and 5G-TMSI offset) at any time.

So, in the method of FIG. 10, the main principles of S2-2000264 are followed for MT-EDT. When the 5G-TMSI has been used once for 5G-S-TMSI paging, both UE and AMF step up the 5G-TMSI as follows: Generate and transmit new 5G-TMSI derived from the 5G-TMSI and the additional information such as the 5G-TMSI offset, the AMF may increment 5G-TMSI by 5G-TMSI offset upon receiving CP SR in step 6, the NG-RAN may send a message (e.g., msg4) only after steps 6 and 7, the UE may increment 5G-TMSI by the 5G-TMSI offset based on lower layer indication of successful delivery of CP SR across the radio interface in step 8, the UE condition to update 5G-TMSI may follow the Registration call flow in step 22, and the AMF may page using just one 5G-S-TMSI.

Figure 11:
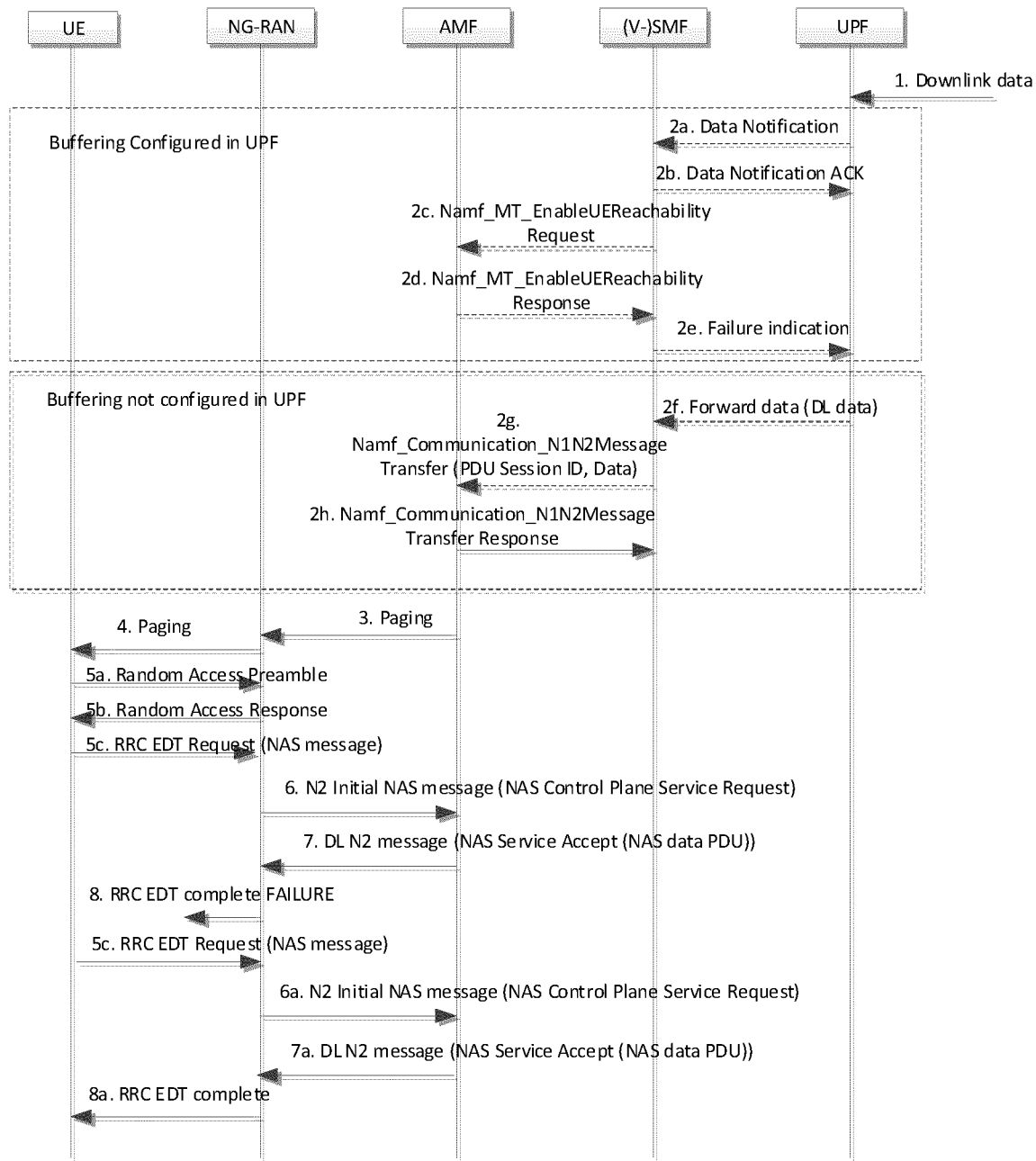
FIG. 11 is a message diagram illustrating another approach of the method according to FIG. 10.

FIG. 11 illustrates a method in the case an RCC message is lost. To promote an understanding and for illustration purposes, FIG. 11 is based on FIG. 10. However, the above method of assigning a new GUTI is just an exemplary scenario where the method in the case an RCC message is lost can be used. That means, the method of FIG. 11 can be used for the above described assignments of a new GUTI in the case the new GUTI assignment fails and, e.g., an RCC message is lost. However, the method of FIG. 11 can be also used for any other methods of assigning a new GUTI when the new GUTI assignment fails and further/repeated new GUTI assignment is necessary. Therefore, observations already given with respect to FIG. 10 are not repeated here, but apply to examples where the method of FIG. 11 is used in combination with the method of FIG. 10, while for examples where the method of FIG. 11 is used in combination with another new GUTI assignment method, the steps of FIG. 10 do not apply and have to be replaced by steps for carrying out the another method.

In the method of FIG. 10, the RRC message in step 8 may be lost. In this case, the UE may consider the UL transmission failed and stays with the old 5G-GUTI according to FIG. 11. Further, in FIG. 11, UE criteria to adopt new 5G-GUTI are not met, so the UE repeats step 5c with NAS message (CP Service Request) with its old identity. Based on the UE re-transmitting using old identity, the AMF performs error recovery by falling back to the previous 5G-GUTI when responding in step 7a (similar to step 7 of FIG. 10). For example, the AMF in this error handling may reverse from the new 5G-GUTI adopted after step 6 to the previous 5G-GUTI successfully confirmed by the UE and thus irrespective of the method applied to get the new 5G-GUTI. If the re-transmission is completed successfully (as in step 8a; similar to step 8 of FIG. 10), the AMF knows that the procedure was successful and starts using new 5G-GUTI.

Without in any way limiting the scope, interpretation, or application of the claims appearing below, a technical effect of one or more of the example embodiments disclosed herein may be GUTI reallocation.

The subject-matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and sub-combinations of the disclosed features and/or combinations and sub-combinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

The invention claimed is:

1. A method, comprising:

receiving, at a user equipment, UE, a first message from a network, the first message including a first global unique temporary identifier, GUTI, and additional information, at least the first GUTI being assigned to the UE;

receiving a first data transmission including the first GUTI from the network;

in response to receiving the first data transmission, deriving, at the UE, a second GUTI based on the first GUTI and the additional information;

receiving a second data transmission including the second GUTI from the network;

reserving the first GUTI specifically for the UE;

reserving the second GUTI specifically for the UE;

reserving the additional information specifically for the UE;

reserving the second GUTI for the UE prior to transmitting/receiving the first data transmission, wherein the second GUTI is derived based on the first GUTI and the additional information;

in response to transmitting the first data transmission, reserving a third GUTI derived based on the second GUTI and the additional information, the third GUTI to be used in subsequent data transmission to the UE; and when the first data transmission is not received within a given time period, transmitting, by the UE, a third data transmission to the network, the third data transmission including the first GUTI and dummy payload, the third data transmission indicating to the network that the first data transmission was not received and to reverse back to the first GUTI, wherein the first message is received/transmitted during a registration procedure for registering the UE with the network or an update procedure for updating information of the UE at the network, wherein the first message is a Registration Accept message in the registration procedure or a UE Configuration Update, UCU, message in the update procedure, wherein the network comprises a network node, and wherein the network node is an Anchor Mobility Function, AMF, wherein the additional information is an offset value or a Temporary Mobile Station Identifier key value, wherein at least one of the first and second data transmissions is transmitted to/received by the UE while the UE is in idle mode, wherein at least one of the first and second data transmissions is a paging message or mobile-terminated early data transmission, MT-EDT, wherein at least one of the first and second data transmissions is a transmission of a single data packet whose size fits into a single radio transmission, wherein at least one of the first and second data transmissions includes new additional information to be used in deriving the second GUTI, wherein at least one of the additional and the new additional information is scrambled based on an International Mobile Subscriber Identity of the UE, and wherein the transmitting of the first data and the second data includes transmitting by an infrared (IR) transceiver, a Bluetooth (BT) transceiver, a wireless universal serial bus (USB) transceiver, a Bluetooth Low Energy transceiver, a ZigBee transceiver, an ANT transceiver, a cellular device-to-device transceiver, and a wireless local area link transceiver.

* * * * *